United States Patent
Khan et al.

(10) Patent No.: US 11,929,820 B2
(45) Date of Patent: Mar. 12, 2024

(54) FREQUENCY ADJUSTMENT FOR NON-TERRESTRIAL NETWORKS

(71) Applicant: TELEFONAKTIEBOLAGET LM ERICSSON (PUBL), Stockholm (SE)

(72) Inventors: Talha Khan, Santa Clara, CA (US); Olof Liberg, Enskede (SE); Stefan Eriksson Löwenmark, Färentuna (SE); Xingqin Lin, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/636,009

(22) PCT Filed: Aug. 12, 2020

(86) PCT No.: PCT/IB2020/057596
§ 371 (c)(1),
(2) Date: Feb. 16, 2022

(87) PCT Pub. No.: WO2021/033085
PCT Pub. Date: Feb. 25, 2021

(65) Prior Publication Data
US 2022/0286198 A1  Sep. 8, 2022

Related U.S. Application Data

(60) Provisional application No. 62/910,174, filed on Oct. 3, 2019, provisional application No. 62/888,100, filed on Aug. 16, 2019.

(30) Foreign Application Priority Data

Nov. 1, 2019  (WO) ................. PCT/EP2019/080001

(51) Int. Cl.
*H04B 7/185* (2006.01)
*H04W 56/00* (2009.01)

(52) U.S. Cl.
CPC ...... *H04B 7/1855* (2013.01); *H04W 56/0035* (2013.01); *H04W 56/0045* (2013.01)

(58) Field of Classification Search
CPC ............ H04B 7/1855; H04W 56/0035; H04W 56/0045
See application file for complete search history.

(56) References Cited

U.S. PATENT DOCUMENTS 6,464,643 B1 * 10/2002 Brock-Fisher .......... G01S 15/52
                                                   600/458
6,529,485 B1 *  3/2003 Agarwal ............ H04B 7/18513
                                                   370/324

(Continued)

FOREIGN PATENT DOCUMENTS

CN       105474740 B    12/2019
EP         0848509 A1    6/1998

(Continued)

OTHER PUBLICATIONS

3GPP TR 38.811 V15.1.0, "3rd Generation Partnership Project; Technical Specification Group Radio Access Network; Study on New Radio (NR) to support non-terrestrial networks (Release 15)", 3GPP TR 38.811 V15.1.0, Jun. 2019.

(Continued)

*Primary Examiner* — Dominic E Rego

(57) ABSTRACT

Systems and methods are disclosed herein for frequency adjustment in a wireless network, particularly a Non-Terrestrial Network (NTN). Embodiments of a method performed by a User Equipment (UE) are disclosed. In one embodiment, a method performed by a UE for compensating for a Doppler shift in a wireless network comprises obtaining, from a network node, a characterization of Doppler variations in a particular cell. The method further comprises tuning a local frequency reference $f_{Ref}$ of the UE to a received downlink frequency for the particular cell and (Continued)

adjusting the local frequency reference $f_{Ref}$ over time according to the pre-calculated characterization of Doppler variations in the particular cell. In this manner, the communication between the UE and the network node in the presence of large and varying Doppler shifts is enabled. Embodiments related to compensating for timing drift are also disclosed.

20 Claims, 15 Drawing Sheets

(56) References Cited

U.S. PATENT DOCUMENTS

| | | | |
|---|---|---|---|
| 6,701,127 B1 | 3/2004 | Wreschner et al. | |
| 7,283,091 B1* | 10/2007 | Loomis | G01S 19/48 342/357.62 |
| 7,327,311 B2* | 2/2008 | Dooley | G01S 19/29 342/357.68 |
| 2002/0105457 A1* | 8/2002 | Dooley | H04B 7/26 342/357.62 |
| 2003/0012293 A1* | 1/2003 | Laurent | H04H 20/30 375/295 |
| 2004/0082303 A1 | 4/2004 | Giannakis et al. | |
| 2009/0303117 A1* | 12/2009 | Boiero | G01S 19/30 342/357.64 |
| 2010/0246720 A1* | 9/2010 | Wang | H04L 1/20 375/316 |
| 2011/0116386 A1 | 5/2011 | Blanchard et al. | |
| 2011/0142115 A1* | 6/2011 | Wang | H04W 64/006 375/340 |
| 2014/0378084 A1* | 12/2014 | Preteseille | H04W 84/045 455/574 |
| 2017/0373907 A1 | 12/2017 | Tan et al. | |
| 2018/0205589 A1 | 7/2018 | Bai et al. | |
| 2018/0330611 A1* | 11/2018 | Jiang | G08G 1/0125 |
| 2019/0313357 A1 | 10/2019 | Wang et al. | |
| 2019/0327762 A1* | 10/2019 | Takeda | H04W 74/0833 |

FOREIGN PATENT DOCUMENTS

| | | |
|---|---|---|
| WO | 2019097855 A1 | 5/2019 |
| WO | 2020031120 A2 | 2/2020 |
| WO | 2020089471 W | 5/2020 |
| WO | 2021033085 A1 | 2/2021 |

OTHER PUBLICATIONS

Ericsson, "On frequency compensation, uplink timing and random access in NTN", 3GPP TSG-RAN WG1 Meeting #98, R1-1909107, Aug. 26-30, 2019, Prague, Czech Republic.

Ericsson, "On random access procedures for NTN" 3GPP TSG-RAN WG2 #106, Tdoc, R2-1907296, May 13-17, 2019, Reno, Nevada, US.

Ericsson, "On UL time and frequency synchronization enhancements for NTN", 3GPP Tsg-Ran WG1 Meeting #102-e, R1-2005502, e-Meeting, Aug. 17-28, 2020.

Mediatek Inc, "Doppler Compensation in initial access procedure in NR-NTN", 3GPP TSG RAN WG1 Meeting #96bis, R1-1904644, April 812, 2019, Xi'an, China.

Oppo, NToperation for Doppler and Timing Advance, 3GPP TSG RAN WG1 #98, R1-1908984, Aug. 26-30, 2019, Prague, Czech.

Thales, "NR-NTN: NR impact area identification, initial downlink synchronisation", 3GPP TSG RAN Meeting #79, RP-180543, Thales, Chennai, India, Mar. 19-23, 2018.

Thales, "Study on solutions evaluation for NR to support Non Terrestrial Network", 3GPP TSG RAN meeting #80, RP-181370, Jun. 11-14, 2018, La Jolla, USA.

Huawei et al., "Discussion on timing advance and RACH for NTN", 3GPP TSG RAN WG1 Meeting #97, R1-1905994, Reno, USA, May 13-17, 2019.

\* cited by examiner

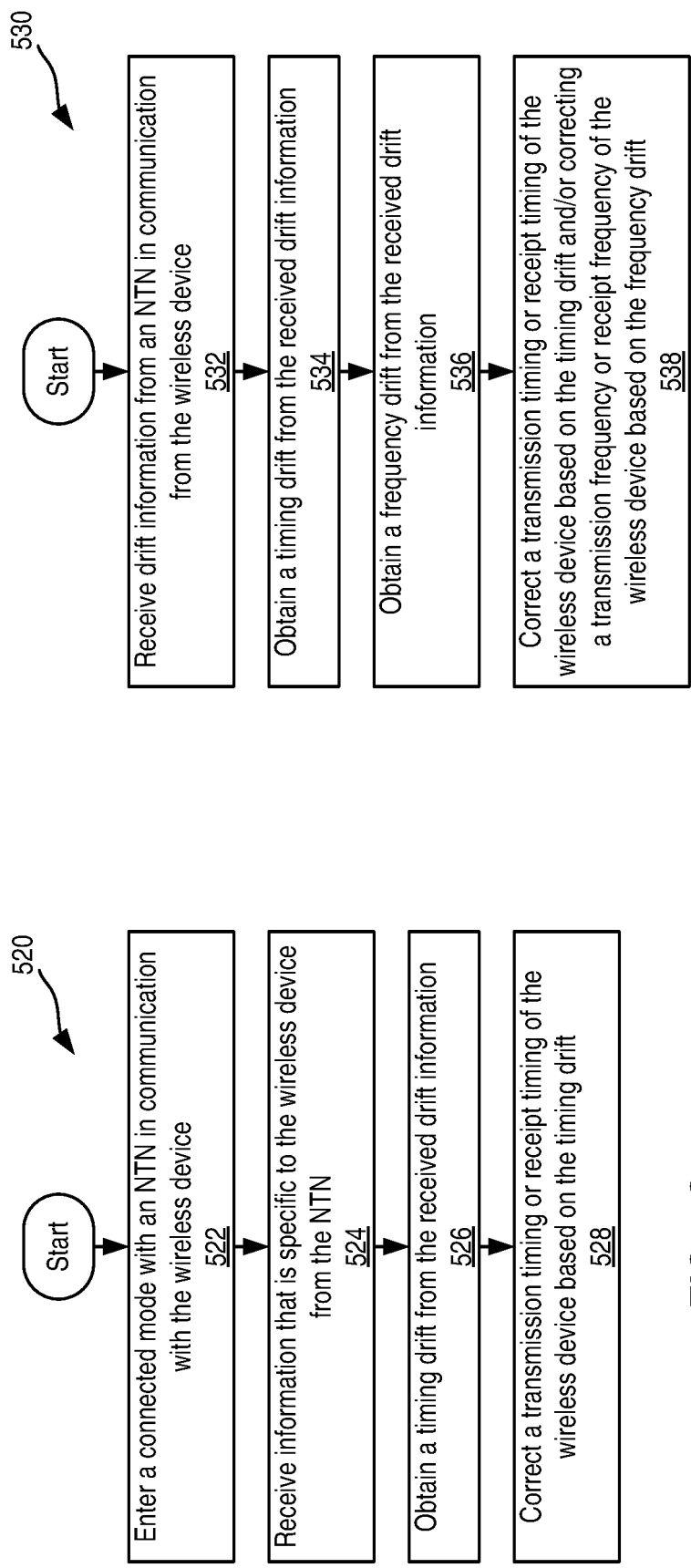

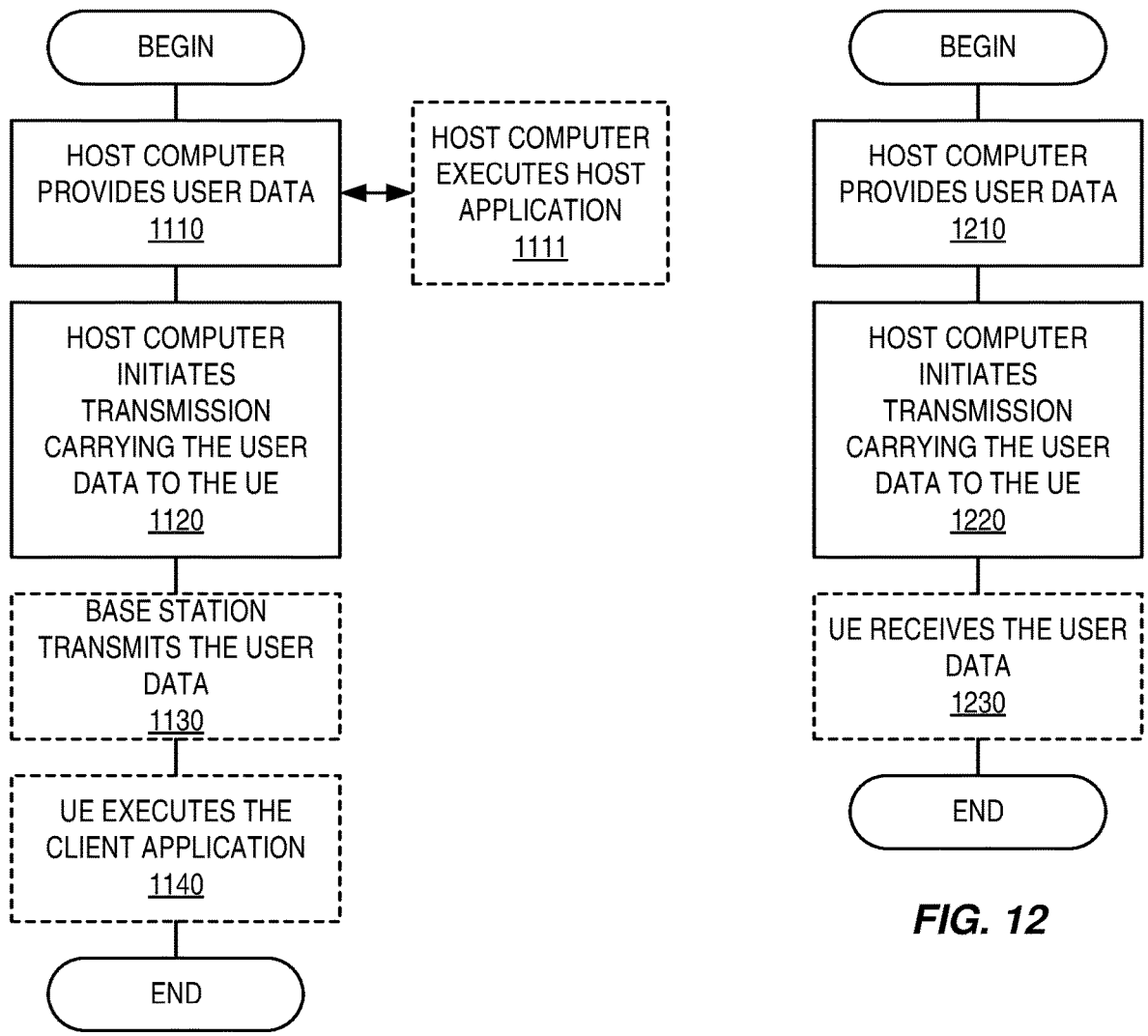

FREQUENCY ADJUSTMENT FOR NON-TERRESTRIAL NETWORKS

RELATED APPLICATIONS

This application is a national stage application of International Patent Application No. PCT/IB2020/051102, filed Feb. 11, 2020, which claims the benefit of U.S. Provisional Patent application Ser. No. 62/888,100, filed Aug. 16, 2019, U.S. Provisional Patent Application No. 62/910,174, filed Oct. 3, 2019, and International Patent Application No. PCT/EP2019/080001, filed Nov. 11, 2019, the disclosures of which are hereby incorporated herein by reference in their entirety.

TECHNICAL FIELD

The present disclosure relates to Non-Terrestrial Networks (NTNs) and in particular frequency adjustment due to Doppler shift of uplink and downlink transmissions.

BACKGROUND

There is an ongoing resurgence of satellite communications. Several plans for satellite networks have been announced in the past few years. The target services vary from backhaul and fixed wireless, to transportation, to outdoor mobile, to Internet-of-Things (IoT). Satellite networks could complement mobile networks on the ground by providing connectivity to underserved areas and providing multicast/broadcast services.

To benefit from the strong mobile ecosystem and economy of scale, adapting the terrestrial wireless access technologies including Third Generation Partnership Project (3GPP) Long Term Evolution (LTE) and New Radio (NR) for satellite networks is drawing significant interest. For example, 3GPP completed an initial study in Release 15 on adapting NR to support Non-Terrestrial Networks (NTNs) (mainly satellite networks), see 3GPP Technical Report (TR) 38.811 V15.0.0 (2018 Aug. 10). This initial study focused on the channel model for the NTNs, defining deployment scenarios, and identifying the key potential impacts. 3GPP is conducting a follow-up study item in Release 16 on solutions evaluation for NR to support NTNs, see for example "Study on solutions evaluation for NR to support non-terrestrial Network," 3GPP tdoc RP-181370.

I. Satellite Communications

A satellite Radio Access Network (RAN) usually includes the following components: a "gateway" that connects a satellite network to a core network, a "satellite" that refers to a space-borne platform, a "terminal" that refers to User Equipment (UE), a feeder link that refers to the link between a gateway and a satellite, and a service link that refers to the link between a satellite and a terminal. The link from the gateway to the terminal is often called a forward link, and the link from the terminal to the gateway is often called a return link Depending on the functionality of the satellite in the system, two transponder options can be considered: (1) a bent pipe transponder in which the satellite forwards the received signal back to the earth with only amplification and a shift between service link frequency and feeder link frequency and (2) a regenerative transponder in which the satellite includes on-board processing to demodulate and decode the received signal and regenerate the signal before sending it back to the earth.

Depending on the orbit altitude, a satellite may be categorized as a Low Earth Orbit (LEO), Medium Earth Orbit (MEO), or Geostationary Orbit (GEO) satellite as indicated below:

LEO: typical heights ranging from 250-1,500 kilometers (km), with orbital periods ranging from 90-130 minutes;

MEO: typical heights ranging from 5,000-25,000 km, with orbital periods ranging from 2-14 hours; and GEO: typical height is about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the Earth's surface with the satellite movement or may be fixed on the Erath with some beam pointing mechanism used by the satellite to compensate for its motion. The size of a spotbeam depends on the system design, which may range from tens of kilometers to a few thousand kilometers.

FIG. 1 shows an example architecture of a satellite network 30, which is an example of an NTN. The satellite network 30 comprises communications satellites 10 communicating with terrestrial antennas or gateways 20, which are then in communication with terrestrial base station(s) 40, e.g., a NR base station (gNB), an enhanced or evolved Node B (eNB), etc. The communications satellites 10 create respective cells in the form of a spotbeam or spotbeam footprint 50 to provide cellular service to one or more wireless devices, e.g., a UE 60. In some examples, as shown by a feeder link 70 and a service link 80, the communications satellite 10 comprises a bent pipe transponder.

The two main physical phenomena that affect satellite communications system design are the long propagation delay and Doppler effects. The Doppler effects are especially pronounced for LEO satellites.

A. Propagation Delays

Propagation delay is a main physical phenomenon in a satellite communications system that makes the design different from that of a terrestrial mobile system. For a bent pipe satellite network, the following delays are relevant:

One-way delay from the base station to the UE via the satellite, or the other way around;

Round-trip delay from the base station to the UE via the satellite and from the UE back to the base station via the satellite; and Differential delay, which is the delay difference of two selected points in the same spotbeam.

Note that there may be additional delay between the ground base station antenna and the base station, which may or may not be collocated. This delay depends on deployment. If the delay cannot be ignored, it should be taken into account in the communications system. The propagation delay depends on the length of the signal path, which further depends on the elevation angles of the satellite seen by the base station and UE on the ground. The minimum elevation angle is typically more than 10° for the UE and more than 5° for the base station on the ground. These values will be assumed in the delay analysis below.

The following Tables 1 and 2 are taken from 3GPP TR 38.811. The round-trip delay is much larger in satellite systems. For example, it is about 545 milliseconds (ms) for a GEO satellite system. In contrast, the Round-Trip Time (RTT) is normally no more than 1 ms for typical terrestrial cellular networks.

TABLE 1

Propagation delays for GEO satellite at 35,786 km

| | | GEO at 35786 km | |
|---|---|---|---|
| Elevation angle | Path | D (km) | Time (ms) |
| UE:10° | satellite - UE | 40586 | 135.286 |
| GW: 5° | satellite - gateway | 41126.6 | 137.088 |
| 90° | satellite - UE | 35786 | 119.286 |
| | Bent Pipe satellite | | |
| One way delay | Gateway-satellite_UE | 81712.6 | 272.375 |
| Round trip Time | Twice | 163425.3 | 544.751 |
| | Regenerative Satellite | | |
| One way delay | Satellite -UE | 40586 | 135.286 |
| Round Trip Time | S atellite-UE-Satellite | 81172 | 270.572 |

TABLE 2

Propagation delays for NGSO satellites

| | | LEO at 600 km | | LEO at 1500 km | | MEO at 10000 km | |
|---|---|---|---|---|---|---|---|
| Elevation angle | Path | Distance D (km) | Delay (ms) | Distance D (km) | Delay (ms) | Distance D (km) | Delay (ms) |
| UE: 10° | satellite - UE | 1932.24 | 6,440 | 3647.5 | 12,158 | 14018.16 | 46.727 |
| GW: 5° | satellite - gateway | 2329.01 | 7.763 | 4101.6 | 13.672 | 14539.4 | 48.464 |
| 90° | satellite - UE | 600 | 2 | 1500 | 5 | 10000 | 33.333 |
| | Bent pipe satellite | | | | | | |
| One way delay | Gateway-satellite UE | 4261.2 | 14.204 | 7749.2 | 25.83 | 28557.6 | 95.192 |
| Round Trip Delay | Twice | 8522.5 | 28.408 | 15498.4 | 51.661 | 57115.2 | 190.38 |
| | Regenerative satellite | | | | | | |
| One way delay | Satellite -UE | 1932.24 | 6.44 | 3647.5 | 12.16 | 14018.16 | 46.73 |
| Round Trip Delay | Satellite-UE-Satellite | 3864.48 | 12.88 | 7295 | 24.32 | 28036.32 | 93.45 |

Generally, within a spotbeam covering one cell, the delay can be divided into a common delay component and a differential delay component. The common delay is the same for all UEs in the cell and is determined with respect to a reference point in the spotbeam. In contrast, the differential delay is different for different UEs which depends on the propagation delay between the reference point and the point at which a given UE is positioned within the spotbeam.

The differential delay is mainly due to the different path lengths of the service links, since the feeder link is normally the same for terminals in the same spotbeam. Further, the differential delay is mainly determined by the size of the spotbeam. It may range from sub-millisecond (for a spotbeam on the order of tens of kilometers) to tens of milliseconds (for a spotbeam on the order of thousands of kilometers).

The Doppler shift problem is illustrated in FIG. 3. Two UEs, UE1 and UE2, are served by the same satellite. The satellite S is moving in an orbit around earth E. The UEs are also moving, due to the Earth's rotation and possibly also due to movement relative to the Earth's surface. Due to the movement of the satellite, the distance between the satellite S and UE1 will decrease, resulting in a positive Doppler shift. At the same time, the distance between the satellite S and UE2 will increase, resulting in a negative Doppler shift.

The differential shift problem is shown in FIG. 4. In this example, the spotbeam is directed towards the forward direction of the satellite. UE1 experiences a large positive Doppler shift while UE2 experiences a small positive Doppler shift. Pre-compensation of the downlink transmit frequency can be applied in this case such that the received signal, e.g., at the center of the spotbeam appears to have zero Doppler shift. However, UE1 and UE2 will still experience different residual Doppler shifts and the problem remains. One problem with some existing solutions is that the received carrier frequency is used as a frequency reference, without taking Doppler shift into account.

B. Doppler Effects

Doppler is another major physical phenomenon that needs to be taken into account when designing a satellite communications system. The following Doppler effects are particularly relevant.

Doppler shift: the shift of the signal frequency due to the motion of the transmitter, the receiver, or both.

Doppler variation rate: the derivative of the Doppler shift function of time, i.e. it characterizes how fast the Doppler shift evolves over time.

Doppler effects depend on the relative speed of the satellites and the UE and the carrier frequency.

For GEO satellites, they are fixed in principle and thus do not induce Doppler shift. In reality, however, they move around their nominal orbital positions due to, for example, perturbations. As discussed in 3GPP TR 38.811, a GEO satellite is typically maintained inside a box:

+/−37.5 km in both latitude and longitude directions corresponding to an aperture angle of +/−0.05°, and
+/−17.5 km in the equatorial plane.

The trajectory of the GEO satellite typically follows a figure "8" pattern, as illustrated in FIG. 2. Table 3 gives example Doppler shifts of GEO satellites. For a GEO satellite maintained inside the box and moving according to the figure "8" pattern, we can see that the Doppler shifts due to the GEO satellite movement are negligible.

| | Frequency | 2 GHz | 20 GHz | 30 GHz |
|---|---|---|---|---|
| S2 to S1 | Doppler shift (Hz) | −0.25 | −2.4 | −4.0 |
| S1 to S4 | Doppler shift (Hz) | 2.25 | 22.5 | 34 |
| Not maintained inside the box (with inclination up to 6°) | Doppler shift (Hz) | 300 | 3000 | 4500 |

If a GEO satellite is not maintained inside the box, the motion could be near GEO orbit with inclination up to 6°. The Doppler shifts due to the GEO satellite movement may not be negligible.

The Doppler effects become remarkable for MEO and LEO satellites. Table 4 gives example Doppler shifts and rates of Non-GEO (NGSO) satellites. We can see that the Doppler shifts and rates due to the NGSO satellite movement should be properly considered in the communications system design.

TABLE 4

Doppler shifts and variation rates of NGSO satellites

| Frequency (GHz) | Max Doppler | Relative Doppler | Max Doppler shift variation | |
|---|---|---|---|---|
| 2 | +/−48 kHz | 0.0024% | −544 Hz/s | LEO at 600 km altitude |
| 20 | +/−480 kHz | 0.0024% | −5.44 kHz/s | |
| 30 | +/−720 kHz | 0.0024% | −8.16 kHz/s | |
| 2 | +/−40 kHz | 0.002% | −180 Hz/s | LEO at 1500 km altitude |
| 20 | +/−400 kHz | 0.002% | −1.8 kHZ/s | |
| 30 | +/−600 kHz | 0.002% | −2.7 kHz/s | |
| 2 | +/−15 kHz | 0.00075% | −6 Hz/s | MEO at 10000 km altitude |
| 20 | +/−150 kHz | 0.00075% | −60 Hz/s | |
| 30 | +/−225 kHz | 0.00075% | −90 Hz/s | |

C. 3GPP Study Item (SI) on NTN

In RAN #80, a new SI "Solutions for NR to support Non-Terrestrial Networks" was agreed (see 3GPP TR 38.811). It is a continuation of a preceding SI "NR to support Non-Terrestrial Networks" (RP-171450), where the objective was to study the NTN channel model, to define deployment scenarios and parameters, and to identify the key potential impacts on NR. The results are reflected in 3GPP TR 38.811. The objectives of the current SI are to evaluate solutions for the identified key impacts from the preceding SI and to study impacts on RAN protocols/architecture.

II. Random Access Procedures in LTE and NR

The random access procedures in LTE and NR are similar In the existing random access design, random access procedures serve multiple purposes such as initial access when establishing a radio link, scheduling request, etc. Among others, an important objective of the random access procedures is to achieve uplink synchronization, which is important for maintaining the uplink orthogonality in LTE and NR. To preserve the orthogonality of uplink signals from different UEs in an Orthogonal Frequency Division Multiple Access (OFDMA) based system, the Time of Arrival (TOA) of each UE's signal needs to be within the Cyclic Prefix (CP) of the Orthogonal Frequency Division Multiplexing (OFDM) signal at the base station.

III. Frequency Adjustment in LTE and NR

An LTE/NR UE utilizes the broadcast synchronization sequences (Primary Synchronization Signal (PSS)/Secondary Synchronization Signal (SSS)) to estimate the downlink frequency from a base station. The estimated frequency is used as a reference, based on which it adjusts its local oscillator that determines both downlink (receive) and uplink (transmit) frequency.

IV. Pre/Post Compensation

To deal with large Doppler shifts in LEO/MEO satellite communications systems, pre-compensation (i.e., an offset of the transmit frequency) can be applied to the signal in the downlink such that the downlink signal received at a reference point in the spotbeam (e.g., the center of a spotbeam) appears to have zero Doppler shift from the satellite movement relative to the reference point. With pre-compensation, only residual Doppler shift appears in the downlink signal received at the other locations in the spotbeam.

Similarly, post-compensation (i.e., an offset of the receive frequency) can be applied to the signal in the uplink such that the uplink signal transmitted from a reference point in the spotbeam (e.g., the center of a spotbeam) appears to have zero Doppler shift at the network side. With post-compensation, only residual Doppler shift appears in the uplink signal transmitted from other locations in the spotbeam.

With pre-compensation in the downlink, the carrier frequency the UE is locked to after synchronization would be off by the corresponding residual Doppler shift. Such residual Doppler shift in the downlink would further translate to the corresponding residual Doppler shift in the uplink With different residual Doppler shifts in the signals from different UEs in the uplink, the orthogonality of OFDMA/Single Carrier Frequency Division Multiple Access (SC-FDMA) would be significantly impacted.

V. Closed-Loop Doppler Compensation During Random Access

Due to the (residual) Doppler shift described above, the local frequency reference $f_{Ref}$ in the UE will be tuned to a frequency $f_{RX,UE}$ during initial downlink synchronization that has an offset $f_{Doppler,DL}$ to the ideal frequency (i.e., the downlink transmit frequency $f_{IDEAL,DL}$):

$$f_{Ref} = f_{RX,UE} = f_{IDEAL,DL} + f_{Doppler,DL}$$

The local frequency reference $f_{Ref}$ is used both to determine the receive and transmit frequency of the UE. In the simplest case of a Time Division Duplexing (TDD) network, the downlink and uplink frequencies, i.e. $f_{IDEAL,DL}$ and $f_{IDEAL,UL}$ are even identical:

$$f_{IDEAL} = f_{IDEAL,DL} = f_{IDEAL,UL}$$

First for simplicity lets continue to consider a TDD network. When the UE accesses the network on the random access channel, its transmit frequency $f_{TX\_RA,UE}$ will therefore have an offset corresponding to the downlink Doppler:

$$f_{TX\_RA,UE} = f_{Ref} = f_{IDEAL} + f_{Doppler,DL}$$

Due to further Doppler shift in the uplink, $f_{Doppler,UL}$, the received signal on the network side will have a total frequency offset of f Doppler,DL $f_{Doppler,UL}$ compared to the ideal frequency:

$$f_{RX,NW} = f_{TX\_RA,UE} + f_{Doppler,UL} = f_{IDEAL} + f_{Doppler,DL} + f_{Doppler,UL}$$

If closed-loop Doppler compensation is used, the network may estimate the Doppler shift based, e.g., on the reception of the Physical Random Access Channel (PRACH). It then communicates the offset ($f_{Doppler,DL} + f_{Doppler,UL}$) to the UE, e.g., in the Random Access Response (RAR). The UE adjusts its uplink transmit frequency in subsequent transmissions by $-(f_{Doppler,DL}+f_{Doppler,UL})$ to $f_{TX,UE}$, thereby cancelling the frequency offset of the received uplink signal on the network side:

$$f_{TX,UE} = f_{Ref} - (f_{Doppler,DL} + f_{Doppler,UL})$$

$$f_{RX,NW} =$$

$$f_{TX,UE} + f_{Doppler,UL} = f_{Ref} - (f_{Doppler,DL} + f_{Doppler,UL}) + f_{Doppler,UL} =$$

$$f_{IDEAL} + f_{Doppler,DL} - (f_{Doppler,DL} + f_{Doppler,UL}) + f_{Doppler,UL} = f_{IDEAL}$$

Since in a TDD system the uplink and downlink Doppler are the same, the adjustment in the uplink transmit signal can be expressed as $-2f_{Doppler}$.

In the case of a Frequency Division Duplexing (FDD) network, the duplex gap $f_{duplex}$ between the downlink and uplink frequencies needs to be taken into consideration. One way of handling this is to consider relative frequency offsets instead of absolute. This can be done as follows: express the relative offset in the local frequency reference as:

$$(f_{IDEAL,DL}+f_{Doppler,DL})/f_{IDEAL,DL}=1+f_{Doppler,DL}/f_{IDEAL,DL}=1+d$$

where $d=f_{Doppler,DL}/f_{IDEAL,DL}$. Then the local frequency reference can be expressed as:

$$f_{Ref}=f_{RX,UE}=f_{IDEAL,DL}(1+d)$$

The relative uplink Doppler shift can also be expressed as:

$$(f_{IDEAL,UL}+f_{Doppler,UL})/f_{IDEAL,UL}=1+f_{Doppler,UL}/f_{IDEAL,UL}=1+d$$

Note that $f_{Doppler,DL}/f_{IDEAL,DL}=f_{Doppler,UL}/f_{IDEAL,UL}$. Then, without adjustment of the uplink transmit frequency, the received frequency at the network side is:

$$f_{RX,NW}=f_{IDEAL}(1+d)^2 \text{ for a TDD system, and}$$

$$f_{RX,NW}=(f_{IDEAL,DL}+f_{duplex})(1+d)^2=f_{IDEAL,UL}(1+d)^2 \text{ for an FDD system.}$$

The network can estimate d from the signal transmitted on PRACH and communicate it to the UE in RAR. For subsequent transmissions, the UE will generate its adjusted transmit frequency as:

$$f_{TX,UE}=(f_{RX,UE}+f'_{duplex})/(1+d)^2,$$

where $f'_{duplex}$ is the duplex distance the UE will incorrectly generate when using the local frequency reference of the UE, i.e., $f'_{duplex}=f_{duplex}(1+d)$.

Then the transmit frequency of the UE will be $$f_{TX,UE}=(f_{RX,UE}+f'_{duplex})/(1+d)^2=(f_{IDEAL,DL}(1+d)+f_{duplex}(1+d))/(1+d)^2=(f_{IDEAL,DL}+f_{duplex})/(1+d).$$

After the uplink signal has been subject to relative uplink Doppler (1+d), the received uplink signal frequency is:

$$f_{RX,NW}=f_{TX,UE}(1+d)=f_{IDEAL,DL}+f_{duplex}=f_{IDEAL,UL}, \text{ as desired.}$$

In summary, a method for closed loop Doppler compensation in a TDD network is that the network estimates the absolute frequency offset $(f_{Doppler,DL}+f_{Doppler,UL})$ on the uplink signal (e.g., on the PRACH) and communicates this to the UE where the UE then adjusts its uplink transmit frequency by an absolute offset $-(f_{Doppler,DL}+f_{Doppler,UL})$. A more general method that functions in both TDD and FDD networks is that the network estimates the relative frequency offset expressed as d (or $(1+d)^2$) and communicates this to the UE where the UE then adjusts its uplink signal frequency by a factor $1/(1+d)^2$.

VI. Timing Advance (TA) Maintenance in NR

The network sends TA commands to a UE in connected mode to maintain uplink timing. There are six bits in the Medium Access Control (MAC) Control Element (CE) for indicating an index $T_A$ where $T_A \in \{0, 1, \ldots, 63\}$ to the UE. The UE calculates the new TA value $N_{TA\_new}$ using $N_{TA\_new}=N_{TA\_old}+(T_A-31)\times16\times64\times2^{-\mu}$ (in units of $T_c$ where $T_c=0.509$ ns), where $15.2^\mu$ kilohertz (kHz) is the Subcarrier Spacing (SCS) and $\mu \in \{0, 1, 2, 3\}$. This allows a maximum change in the TA value of $32\times16\times64\times2^{-\mu} T_c$ which is shown in the following Table 5. To cope with a large timing drift of say 40 μs/s, several such commands per second are required.

TABLE 5

Maximum change in TA value in connected mode for various SCS

| SCS | 15 kHz | 30 kHz | 60 kHz | 120 kHz |
| --- | --- | --- | --- | --- |
| Max. change in TA | 16.67 μs | 8.33 μs | 4.16 μs | 2.08 μs |

Relying solely on TA update commands to deal with timing drift will lead to excessive signaling overhead. Due to this reason, there is a need to empower the UE to adjust its uplink timing amid large propagation delays and timing drift. It has been argued that different UEs in a cell typically experience similar timing drift, which motivates broadcasting drift information for the UEs. However, this may not always be an efficient approach. For example, in certain LEO scenarios, different UEs may experience significantly different timing drifts at a given time.

SUMMARY

Systems and methods are disclosed herein for frequency adjustment in a wireless network, particularly a Non-Terrestrial Network (NTN). Embodiments of a method performed by a User Equipment (UE) are disclosed. In one embodiment, a method performed by a UE for compensating for a Doppler shift in a wireless network comprises obtaining, from a network node, a characterization of Doppler variations in a particular cell. The method further comprises tuning a local frequency reference, $f_{Ref}$, of the UE to a received downlink frequency for the particular cell and adjusting the local frequency reference, $f_{Ref}$, over time according to the pre-calculated characterization of Doppler variations in the particular cell. In this manner, the communication between the UE and the network node in the presence of large and varying Doppler shifts is enabled.

In one embodiment, the method further comprises transmitting signals to or receiving signals from the wireless network based on the adjusted local frequency reference, $f_{Ref}$.

In one embodiment, the method further comprises obtaining, during random access to the particular cell, a correction term, $f_{corr}$, that compensates for a Doppler shift in an uplink transmit frequency of the UE for the particular cell, and adjusting the correction term, $f_{corr}$, over time according to the characterization of Doppler variations in the particular cell.

In one embodiment, the characterization of Doppler variations in the particular cell is a linear approximation quantified by a Doppler rate. In one embodiment, adjusting the local frequency reference, $f_{Ref}$, over time according to the characterization of Doppler variations in the particular cell comprises periodically adjusting the local frequency reference, $f_{Ref}$, over time according to the Doppler rate. In one embodiment, the local frequency reference, $f_{Ref}$, determines a downlink receive frequency of the UE. In one embodiment, the method further comprises obtaining, during random access to the particular cell, a correction term, $f_{corr}$, that compensates for a Doppler shift in an uplink transmit frequency of the UE for the particular cell, and adjusting the correction term, $f_{corr}$, based on the Doppler rate.

In one embodiment, the method further comprises obtaining, during random access to the particular cell, a relative Doppler shift adjustment factor, d. The method further comprises adjusting the relative Doppler shift adjustment factor, d, over time according to the characterization of Doppler variations in the particular cell, and adjusting an uplink transmit frequency correction factor $1/(1+d)^2$ over time based on the adjusted relative Doppler shift adjustment factor, d.

In one embodiment, obtaining the characterization of Doppler variations in the particular cell comprises receiving the characterization of Doppler variations in the particular cell via a connection configuration message, a handover command, system information, or a paging message.

In one embodiment, the method further comprises obtaining, during random access to the particular cell, a relative Doppler shift adjustment factor, d, and adjusting the relative Doppler shift adjustment factor, d, over time according to the characterization of Doppler variations in the particular cell. The method further comprises adjusting an ideal frequency reference, $f_{Ref,IDEAL}$, based on the adjusted relative Doppler shift adjustment factor, d. In one embodiment, an uplink transmit frequency of the UE is based on the ideal frequency reference, $f_{Ref,IDEAL}$. In one embodiment, adjusting the local frequency reference, $f_{Ref}$, over time according to the characterization of Doppler variations in the particular cell comprises adjusting the local frequency reference $f_{Ref}$ over time based on the adjusted relative Doppler shift adjustment factor, d.

In one embodiment, the wireless network is a NTN. In one embodiment, the network node is a terrestrial base station, a non-terrestrial base station, or a gateway for a non-terrestrial base station.

In one embodiment, the characterization of the Doppler variations within the particular cell is pre-calculated.

In one embodiment, the method further comprises performing timing correction at the UE based on the information related to the timing drift.

In one embodiment, adjusting the local frequency reference, $f_{Ref}$, over time comprises adjusting the local frequency reference, $f_{Ref}$, over time based on a hybrid approach that considers both the characterization of Doppler variations in the particular cell and Doppler variation estimated using downlink reference signals.

Corresponding embodiments of a UE are also disclosed. In one embodiment a UE for compensating for a Doppler shift in a wireless network is adapted to obtain, from a network node, a characterization of Doppler variations in a particular cell, and tune a local frequency reference, $f_{Ref}$, of the UE to a received downlink frequency for the particular cell. The UE is further adapted to adjust the local frequency reference, $f_{Ref}$, over time according to the pre-calculated characterization of Doppler variations in the particular cell.

In one embodiment, a UE for compensating for a Doppler shift in a wireless network comprises a radio interface and processing circuitry associated with the radio interface. The processing circuitry is configured to cause the UE to obtain, from a network node, a characterization of Doppler variations in a particular cell, tune a local frequency reference, $f_{Ref}$, of the UE to a received downlink frequency for the particular cell, and adjust the local frequency reference, $f_{Ref}$, over time according to the pre-calculated characterization of Doppler variations in the particular cell.

In another embodiment, a method performed by a UE for compensating for a timing drift in a wireless network comprises receiving, from a network node, information related to a timing drift, obtaining the timing drift based on the information related to the timing drift, and correcting an uplink timing of the UE based on the obtained timing drift.

In one embodiment, the information related to the timing drift is broadcast information related to the timing drift. In one embodiment, the broadcast information related to a timing drift comprises one or more parameters, and obtaining the timing drift comprises obtaining the timing drift based on the one or more parameters according to one or more predefined rules, tables, or formulas. In one embodiment, the broadcast information related to the timing drift is related to an actual timing drift, a differential timing drift, and/or a rate of change of the timing drift.

In one embodiment, the broadcast information related to the timing drift is updated over time.

In one embodiment, the broadcast information is system information.

In one embodiment, receiving the information related to the timing drift comprises obtaining the broadcast information before an initial access attempt. In one embodiment, the UE is required to obtain the broadcast information prior to an initial access attempt. In one embodiment, the UE must have acquired the broadcast information related to the timing drift no earlier than slot $n - n_{drift}$, wherein n is the slot in which an initial access attempt is to be made and $n_{drift}$ is either fixed or signaled in the broadcast information.

In one embodiment, receiving the information related to the timing drift comprises obtaining the broadcast information related to the timing drift upon expiration of a timer, the timer having been started upon receipt of prior broadcast information related to the timing drift by the UE.

In one embodiment, receiving the information related to the timing drift comprises obtaining the broadcast information related to the timing drift responsive to receipt of an instruction from the wireless network to obtain the broadcast information.

In one embodiment, the method further comprises receiving additional information from the network node, and predicting the timing drift as a function of time based on the additional information. In one embodiment, predicting the timing drift as a function of time based on the additional information comprises predicting the timing drift as a function of time based on the additional information and a predefined rule, a formula, and/or a table.

In one embodiment, receiving the information related to the timing drift comprises receiving the information related to the timing drift via UE-specific dedicated signaling. In one embodiment, the method further comprises, prior to receiving the information related to the timing drift via the UE-specific dedicated signaling, entering a connected mode.

In one embodiment, the wireless network is an NTN. In one embodiment, the network node is a terrestrial base station, a non-terrestrial base station, or a gateway for a non-terrestrial base station.

In one embodiment, the method further comprises performing frequency correction at the UE based on the information related to the timing drift.

In one embodiment, correcting the uplink timing of the UE comprises correcting the uplink timing of the UE based on a hybrid approach that considers both the obtained timing drift based on the information related to the timing drift received from the network node and timing drift estimated based on downlink reference signals.

Corresponding embodiments of a UE are also disclosed. In one embodiment, a UE for compensating for a timing drift in a wireless network is adapted to receive, from a network node, information related to a timing drift, obtain the timing drift based on the information related to the timing drift, and correct an uplink timing of the UE based on the obtained timing drift.

In one embodiment, a UE for compensating for a timing drift in a wireless network comprises a radio interface and processing circuitry associated with the radio interface. The processing circuitry is configured to cause the UE to receive, from a network node, information related to a timing drift, obtain the timing drift based on the information related to the timing drift, and correct an uplink timing of the UE based on the obtained timing drift.

Embodiments of a method performed by a network node are also disclosed. In one embodiment, a method performed by a network node for compensating for a Doppler shift and/or a timing drift in a wireless network comprises sending, to one or more UEs in communication with the network node, information comprising a characterization of Doppler variations in a particular cell or information related to a timing drift.

In one embodiment, the information comprises the characterization of Doppler variations in the particular cell. In one embodiment, the characterization of Doppler variations in the particular cell is a linear approximation quantified by a Doppler rate. In one embodiment, sending the information comprising the characterization of Doppler variations comprises sending the information comprising the characterization of Doppler variations in a configuration message, a handover command, system information, or a paging message.

In one embodiment, the information comprises the information related to the timing drift. In one embodiment, the information related to the timing drift is broadcast information related to the timing drift. In one embodiment, the broadcast information related to the timing drift is related to an actual timing drift, a differential timing drift, and/or a rate of change of the timing drift. In one embodiment, the broadcast information related to timing drift is updated over time.

In one embodiment, sending the information related to the timing drift comprises sending the information related to the timing drift to a UE via UE-dedicated signaling.

In one embodiment, the wireless network is an NTN. In one embodiment, the network node is a terrestrial base station, a non-terrestrial base station, or a gateway for a non-terrestrial base station.

Corresponding embodiments of a network node are also disclosed. In one embodiment, a network node for compensating for a Doppler shift and/or a timing drift in a wireless network is adapted to send, to one or more UEs in communication with the network node, information comprising a characterization of Doppler variations in a particular cell or information related to a timing drift.

In one embodiment, a network node for compensating for a Doppler shift and/or a timing drift in a wireless network comprises processing circuitry configured to cause the network node to send, to one or more UEs in communication with the network node, information comprising a characterization of Doppler variations in a particular cell or information related to a timing drift.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 5A, 5B, 5C, 5D, 5E, and 5F are flowcharts of methods performed by a wireless device in accordance with some embodiments of the present disclosure.

FIG. 11 depicts a flowchart of a method implemented in a communication system including a host computer, a base station, and a UE in accordance with some embodiments of the present disclosure.

FIG. 12 depicts a flowchart of a method implemented in a communication system including a host computer, a base station, and a UE in accordance with some embodiments of the present disclosure.

DETAILED DESCRIPTION

Figure 1:
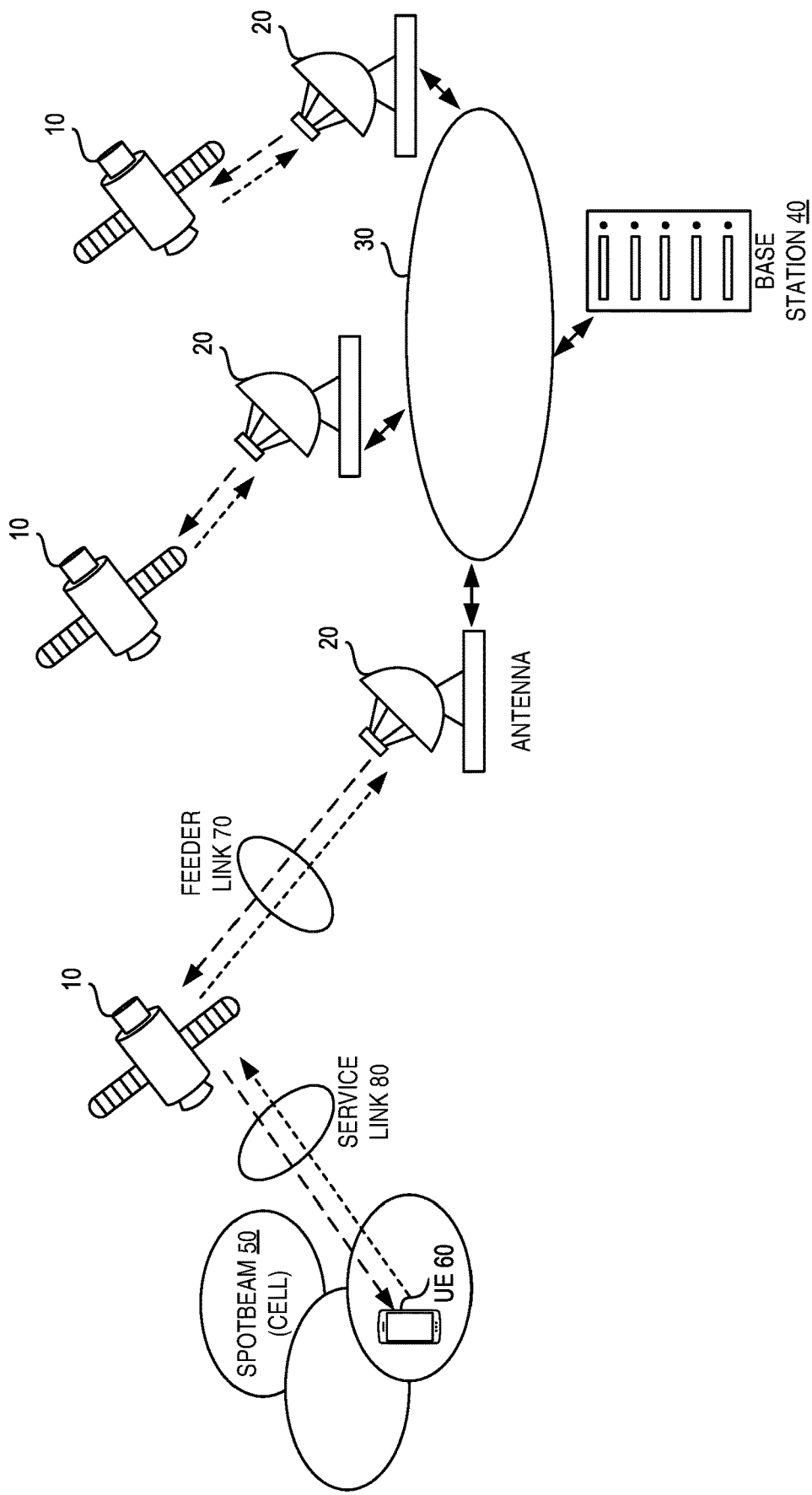
FIG. 1 is an example Non-Terrestrial Network (NTN).
Figure 2:
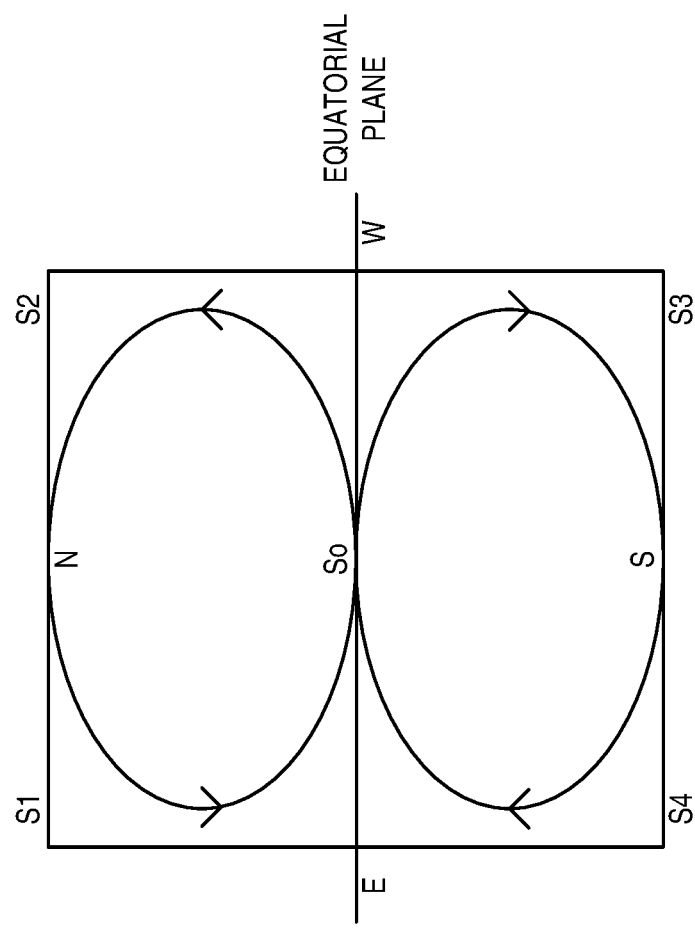
FIG. 2 depicts a trajectory of a Geostationary Orbit (GEO) satellite.
Figure 3:
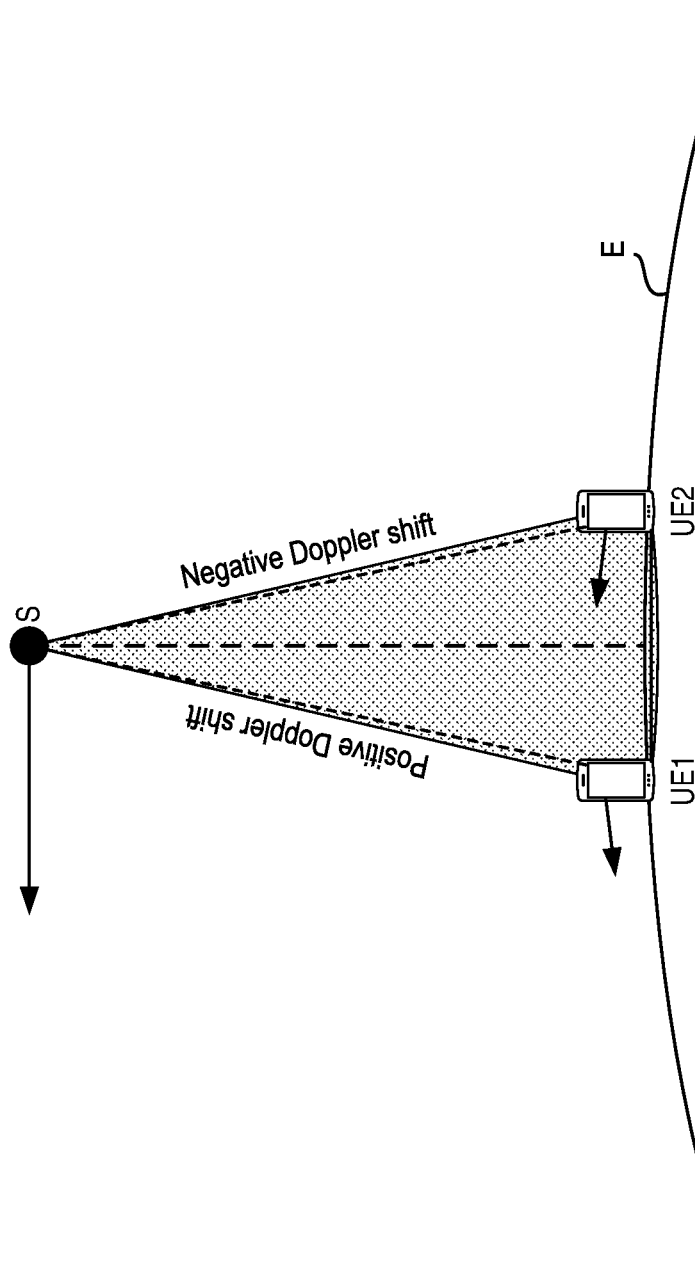
FIG. 3 depicts an example of the Doppler shift problem.
Figure 4:
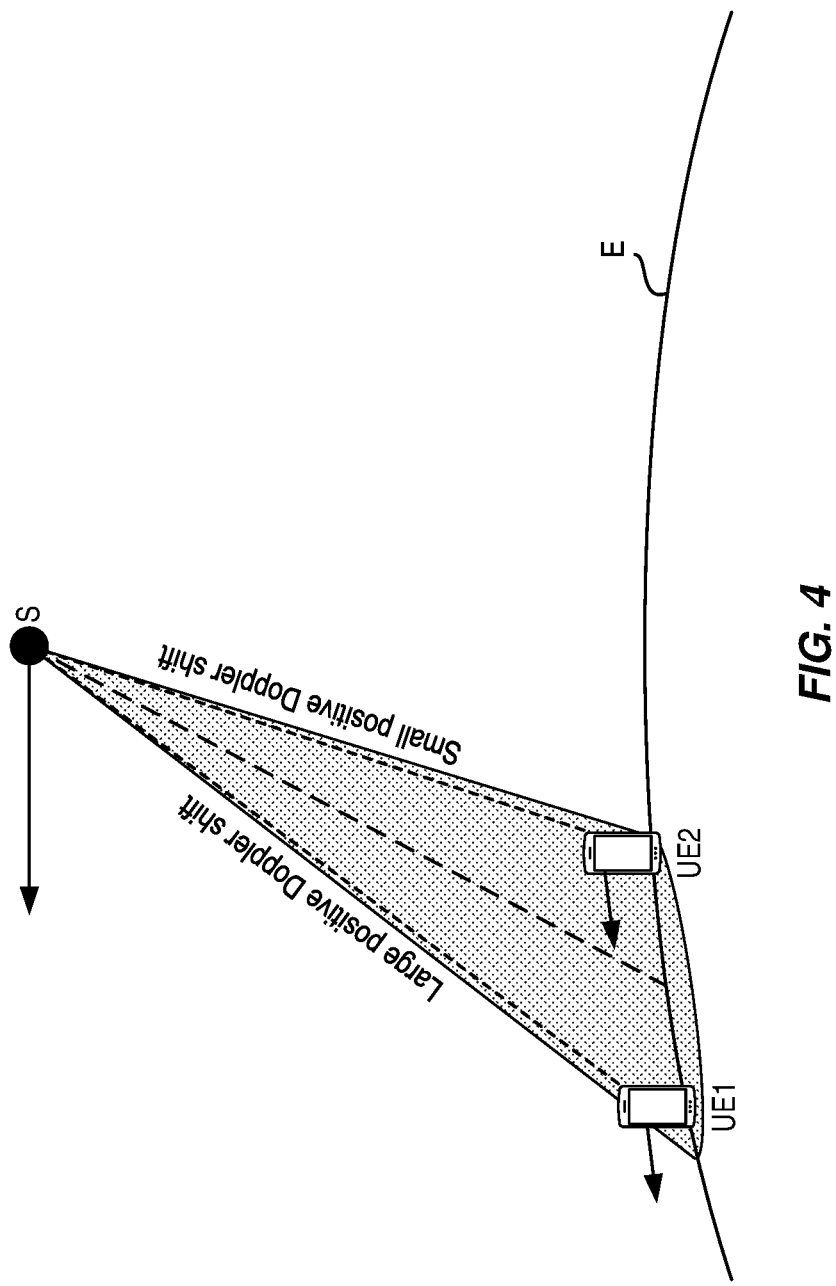
FIG. 4 depicts a further example the Doppler shift problem.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. In particular, a network node may be comprised in a Non-Terrestrial Network (NTN) as part of a wireless communications system. An NTN comprises communications satellites and network nodes. The network nodes may be terrestrial or satellite based. For example, the network node may be a satellite gateway or a satellite based base station, e.g. a New Radio (NR) base station (gNB). Note, however, that an NTN is not limited to a satellite-based network, but rather may include other types of non-terrestrial, or aerial, network nodes, such as balloon-based or drone-based network nodes. Other examples of network nodes include, but are not limited to, Access Points (APs) (e.g., radio access points), base stations (e.g., radio base stations, Node Bs, enhanced or evolved Node Bs (eNBs), and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR base stations, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As used herein, wireless device refers to a device capable, configured, arranged, and/or operable to communicate wirelessly with network nodes and/or other wireless devices. Unless otherwise noted, the term wireless device may be used interchangeably herein with User Equipment (UE). Communicating wirelessly may involve transmitting and/or receiving wireless signals using electromagnetic waves, radio waves, infrared waves, and/or other types of signals suitable for conveying information through air. In particular, the wireless device may be involved in communication with an NTN node, such as communications satellites and satellite-based gateways or base stations. In some embodiments, a wireless device may be configured to transmit and/or receive information without direct human interaction. For instance, a wireless device may be designed to transmit information to a network on a predetermined schedule, when triggered by an internal or external event, or in response to requests from the network.

Certain problems exist with current approaches and implementations. As noted, the propagation delay as well as the Doppler shift experienced by a UE can change rapidly with time due to high speed satellite motion. Due to the particularly large Doppler shifts of signals transmitted from Low Earth Orbit (LEO) and Medium Earth Orbit (MEO) satellites, the perceived receive frequency of a UE can have a substantial frequency offset. Even if the satellite applies pre-compensation on the downlink signal such that the residual frequency offset is zero in a reference point in each spotbeam, a non-zero Doppler shift will remain in other parts of the spotbeam. As the satellite moves, the received frequency offset will vary with time. This variation can have a substantial rate, especially for a LEO satellite.

The Doppler shift of a signal can be derived using the formula $$f_d = \frac{f_c}{c}(\overline{v}_{sat} - \overline{v}_{ue}) \cdot \overline{d}_{sat,ue} \qquad \text{(Equation 1)}$$

where $f_c$ is the carrier frequency, c is the speed of light, $\overline{v}_{sat}$ is the velocity vector of the satellite, $\overline{v}_{ue}$ is the velocity vector of the UE, and $\overline{d}_{sat,ue} = (\overline{x}_{ue} - \overline{x}_{sat})/\|\overline{x}_{ue} - \overline{x}_{sat}\|$ is a unit length vector directed from the satellite to the UE. In some embodiments, the Doppler shift may be estimated based on at least one of a position of a communications satellite via which the UE communicates with the network node; a velocity of the satellite; a position of the UE, and a velocity of the UE. In some examples, the position and/or velocity are determined using one or more of a Global Navigation Satellite System (GNSS), a Global Positioning System (GPS), Time Difference of Arrival (TDOA), and estimated Doppler shift differences of downlink signals of two or more satellites.

The Round-Trip Time (RTT) is constantly changing and can vary as fast as 40 microseconds (μs) per second (s) in certain LEO scenarios. Timing Advance (TA) maintenance in the presence of a large drift may require excessive signaling overhead in connected mode. One may allow the UE to self-adjust its TA in between successive TA update commands One known solution is that the network broadcasts drift information, for a reference point like the cell center, in system information which all UEs apply to maintain their timing. This simple approach has several shortcomings, e.g. the timing drift itself may vary with time and different UEs may experience different drifts at a given time.

This disclosure is directed to solutions to these problems. In this disclosure, methods are proposed to allow a UE to autonomously adjust its TA when the timing drift is itself a function of time and UE location. The proposed solution achieves this while maintaining a lower signaling overhead compared to the baseline approach where the network resorts to increasing the frequency of TA update commands to cope with time-varying timing drift.

Solutions are also disclosed for how to adjust the receive frequency for Long Term Evolution (LTE) and NR UEs to compensate for varying Doppler shifts in satellite networks. When entering a new cell, e.g. at cell reselection or handover, the UE performs downlink synchronization and tunes its local frequency reference to the received downlink frequency. The network provides the UE with pre-calculated, cell-specific characterization of how the Doppler shift varies with time in the cell. In one embodiment, the Doppler variation rate is assumed to be linear with time and is therefore characterized only by the Doppler rate. The UE periodically adjusts its local frequency reference as instructed.

An advantage of the described approaches is that the network enables the UE to autonomously perform TA adjustment without waiting for explicit TA update commands, which would require excessive signaling overhead due to potentially large timing drifts.

The proposed methods can help facilitate communications amid large Doppler shifts seen in NTNs. The pre-calculated characterization of the Doppler variation rate reduces or eliminates the need of the UE to estimate the Doppler variation rate based on the downlink signal, which is an advantage especially if the density of reference symbols is insufficient to follow high rate Doppler variations. Additionally, the proposed solution may allow the UE to perform both TA adjustment as well as frequency adjustment.

This disclosure contains methods to cope with Doppler shifts in downlink signals in an NTN. The network provides a pre-calculated, cell-specific characterization of the Doppler variation rate to a UE, and the UE adjusts its local frequency reference accordingly. In particular, the characterization may be expressed as a linear drift.

In addition, solutions are proposed to empower a UE to perform timing adjustment without relying on excessive signaling or tracking. Moreover, the proposed solution can also enable the UE to perform both timing and frequency adjustment.

The embodiments below deal with how to adjust the local frequency reference so that the downlink synchronization is maintained in the presence of frequency drift. In this disclosure, a pre-calculated characterization of the frequency drift is communicated by the network and used by the UE to compensate for the frequency drift. In this disclosure, where pre/post-compensations is/are used, the Doppler shift referred to in the embodiments below refer to residual Doppler shift, and if compensations are not used, the Doppler shift referred to in the embodiments below refer to actual Doppler shift.

Some embodiments also deal with how to adjust the timing so that the uplink synchronization is maintained in the presence of timing drift. The embodiments also address the case where both timing and frequency needs to be adjusted due to large frequency drift as well as timing drift.

In this disclosure, solutions are proposed to adjust the transmit frequency for LTE and NR UEs to compensate for Doppler shifts in satellite networks.

One embodiment may be performed by a wireless device performing the operations of: obtaining a characterization of a Doppler variation rate within a cell of an NTN from a network node of the NTN; tuning a local frequency reference of the wireless device; adjusting the tuning of the local frequency reference based on the characterization of the Doppler variation rate within the cell; and transmitting signals to or receiving signals from the NTN based on the adjusted tuning of the local frequency reference.

Another embodiment may be performed by a wireless device and may include: receiving broadcasted information including drift information from an NTN in communication with the wireless device; obtaining a timing drift from the received drift information; and correcting a transmission timing of the wireless device based on the timing drift.

Another embodiment may be performed by a wireless device and may include: entering a connected mode with an NTN in communication with the wireless device; receiving drift information that is specific to the wireless device from the NTN; obtaining a timing drift from the received drift information; and correcting a transmission timing or receipt timing of the wireless device based on the timing drift.

Another embodiment may be performed by a wireless device and may include: receiving drift information from an NTN in communication with the wireless device; obtaining a timing drift from the received drift information; obtaining a frequency drift from the received drift information; and correcting a transmission timing or receipt timing of the wireless device based on the timing drift and/or correcting a transmission frequency or receipt frequency of the wireless device based on the frequency drift.

Another embodiment may be performed by a wireless device and may include: receiving drift information from an NTN in communication with the wireless device; receiving downlink reference signals from the NTN; obtaining a timing drift and/or a frequency drift based on the received drift information and the downlink reference signals; and correcting a transmission or receipt timing and/or a transmission or receipt frequency of the wireless device based on the timing drift.

Another embodiment may be performed by a wireless device and may include: receiving a Doppler rate from an NTN in communication with the wireless device; adjusting a locally-stored Doppler value based on the received Doppler rate; adjusting a local frequency reference based on the adjusted locally-stored Doppler value; and calculating an updated uplink frequency correction factor and/or an updated ideal frequency reference factor.

Another embodiment may be performed by a network node of an NTN and may include: providing drift information to a wireless device in communication with the non-terrestrial network; transmitting signals to the wireless device; and receiving signals from the wireless device, wherein the signals are transmitted by the wireless device based on the drift information.

I. Frequency Correction

The network provides the UE with a pre-calculated characterization of the Doppler variations in a given cell. When entering the cell, the UE performs downlink synchronization and tunes its local frequency reference $f_{Ref}$ to the received downlink frequency. If the UE accesses the network, closed-loop Doppler shift compensation may be used to adjust the uplink transmit frequency by a correction term $f_{corr} = f_{Doppler,DL} + f_{Doppler,UL}$ communicated by the network to compensate for the uplink and downlink Doppler shift at the time of accessing the cell (see the Closed-Loop Doppler Compensation During Random Access section above). The UE then gradually adjusts its local frequency reference over time according to the provided characterization.

The characterization of the Doppler variations may be a linear approximation, quantified by a Doppler rate. The UE then adjusts its local frequency reference $f_{Ref}$ according to this linear approximation, e.g. by periodically adjusting its local frequency reference $f_{Ref}$ by a fixed amount. E.g., if the UE is provided with the Doppler rate $r_{Doppler}$, expressed in Hertz (Hz) per second, it adjusts its local frequency reference $f_{Ref}$ by $r_{Doppler}T$ Hz every T seconds. The local frequency reference $f_{Ref}$ determines the downlink receive frequency of the UE. The correction rate $r_{Doppler}$ may also be used to periodically adjust the UE transmit frequency correction term $f_{corr}$ communicated by the network when the UE accessed the cell. When adjusting the UE transmit frequency correction term $f_{corr}$, the adjustment should be opposite in direction and doubled in magnitude compared to the adjustment of the local frequency reference $f_{Ref}$ (and thereby the downlink receive frequency), i.e. $-2r_{Doppler}T$ Hz every T seconds.

The solution above is applicable in a Time Division Duplexing (TDD) system. To compensate for the fact that the uplink and downlink Doppler rate are not the same in a Frequency Division Duplexing (FDD) system, the UE may instead adjust the uplink transmit frequency correction term by $-(1+f_{IDEAL,UL}/f_{IDEAL,DL})r_{Doppler}T$ Hz every T seconds.

In a similar embodiment, applicable both for FDD and TDD, a relative Doppler shift adjustment factor d is communicated to the UE when it accesses the cell (see the Background section entitled "Closed-loop Doppler compensation during random access") and closed-loop frequency compensation is used. The uplink transmit frequency is then corrected by the factor $1/(1+d)^2$. In this case, the UE may be provided with a relative Doppler rate $\rho_{Doppler}$ expressing the rate by which the relative Doppler shift d varies with time. At time intervals T, the UE does the following:
- adjusts its stored relative Doppler value by adding $\rho_{Doppler}T$ to it, i.e. $d(k)=d(k-1)+\rho_{Doppler}T$,
- adjusts the local frequency reference by a factor $(1+d(k))/(1+d(k-1))$, and
- calculates the updated uplink transmit frequency correction factor $1/(1+d(k))^2$.

The characterization of the Doppler variation rate can be provided by an NTN node (e.g., gNB, eNB) in a connection configuration message, in a handover command, in a system information, or in a paging message to a UE. The information may be cell specific, but can also apply to a group of cells. It can also be done using UE-specific signaling.

II. Maintaining an Ideal Frequency Reference in the UE

In this embodiment, an ideal frequency reference (i.e., with the frequency $f_{IDEAL,DL}$) is maintained in the UE. If a relative Doppler d is provided by the network through closed-loop Doppler compensation during initial access, and further a relative Doppler rate $\rho_{Doppler}$ is provided by the network, the UE generates the ideal frequency reference as $f_{Ref,IDEAL}=f_{Ref}/(1+d)$.

Then, at time intervals T, the UE does the following:
- adjusts its stored relative Doppler value by adding $\rho_{Doppler}T$ to it, i.e. $d(k)=d(k-1)+\rho_{Doppler}T$.
- adjusts the local frequency reference by a factor $(1+d(k))/(1+d(k-1))$, and
- calculates the updated ideal frequency reference factor $1/(1+d(k))$.

III. Timing Correction

To inform the UE, the network can broadcast information related to timing drift in the system information. The UE uses the broadcasted information to obtain the timing drift and to correct its uplink timing accordingly.

For example, the network (via an NTN node) can convey a timing drift value in system information. Another possibility is to convey some parameters that enable the UE to obtain the timing drift according to predefined rules, tables, or formulas. As the timing drift information changes, the network can update the system information accordingly. Thus, when a UE acquires system information, it gets an updated value.

A. Timing Drift Update

In one embodiment, to ensure that a UE has valid drift information, the network may require the UE to acquire new system information no earlier than a certain preconfigured time before initial access. Specifically, to make an initial access attempt in slot n, the UE must have acquired the drift information no earlier than slot $n-n_{drift}$. The parameter $n_{drift}$ can either be fixed by standard specification or signaled in system information.

In another embodiment, to ensure that a UE has valid drift information, the network may require the UE to acquire new system information after a configurable time period. For example, the network may configure a timer to set the validity period for the drift information. In general, such a timer may count down from a set value or up to a set value. When the UE acquires the drift information, it triggers the timer. The UE may then need to reacquire the drift information once the timer expires.

The information may be related to the actual timing drift and/or the differential timing (delta on the previous drift) drift and/or the rate of change of timing drift to enable the UE to self-adjust its timing while avoiding excessive signaling overhead.

In another embodiment, to ensure that a UE has valid drift information, the network may use Downlink Control Information (DCI) signaling to inform the UE to update system information.

B. Efficient Timing Drift Update

When the timing drift changes significantly and/or rapidly with time, the network may need to send frequent system information updates, which may cause excessive signaling overhead. In addition, the UE may need to reacquire system information frequently if methods in Timing Drift Update above are used, which is not efficient.

In one embodiment, in addition to the timing drift information, the network sends other information to enable the UE to predict the timing drift as a function of time. In other words, once a UE acquires timing drift information, it can leverage such information related to the drift variation to autonomously obtain the timing drift value based on some predefined rules, formulas, or tables.

For example, consider the case where the rate of change of timing drift is approximated by a constant. Then, if the network indicates this value in addition to the timing drift, the UE can update the timing drift it originally acquired without having to reacquire the system information. The network can also avoid sending frequent system information updates due to drift variation. The UE may choose to self-update the TA until it re-reads the system information or the network broadcasts a system information update or the network sends a dedicated message to the UE (e.g., when/if it enters connected mode).

When the UE enters connected mode, the network can use UE-specific dedicated signaling (e.g., Radio Resource Control (RRC) signaling) to send information related to timing drift. Similar to previous embodiments, this information may be related to the actual timing drift and/or the differential timing (delta on the previous drift) drift and/or the rate of change of timing drift to enable the UE to self-adjust its timing while avoiding excessive signaling overhead.

C. Joint Timing and Frequency Drift Update

Due to small Doppler shift in a Geostationary Orbit (GEO) NTN, the frequency drift is insignificant leaving the timing drift as the main challenge. In LEO NTNs, however, both timing and frequency drifts may be present. A common framework to address both issues by leveraging the concepts described herein in Frequency Correction and Timing Correction may be beneficial.

In one embodiment, the network sends information to enable the UE to perform both TA update as well as frequency adjustment using one or more of the methods outlined in the Frequency Correction and Timing Correction sections herein.

For example, the network may signal parameters that allow the UE to obtain a satellite's speed and acceleration information as an intermediate step. The UE can then process this information to obtain timing drift, rate of change of timing drift, frequency drift, and rate of change of frequency drift. Eventually, the UE can leverage the sent information to obtain values for timing and frequency adjustment.

IV. Timing and Frequency Drift Update Aided by Downlink Reference Signal (DL-RS)

In the preceding embodiments, the case where the network (i.e., a node in the network) provided drift information to enable a UE to adjust its timing or frequency is considered. Note that the information broadcast by the network would typically pertain to a particular reference point in the cell or spotbeam. This means that the drift obtained by the UE would be an approximation of the actual instantaneous drift experience by the UE at the UE's location within the cell or spotbeam.

Alternatively, the UE may exploit DL-RSs to estimate or track the timing and frequency drift. A good tracking performance would require a dense configuration of DL-RSs, which may cause significant overhead. In a "dense configuration" a base station configures more reference signals to aid the UE in tracking drift using the reference signals. In contrast, the standard case is where the network is oblivious to the drift tracking performed by UE, such that the number of DL RSs is not increased, and so no extra resources are used. If the UE has other means of obtaining drift such as from information sent by the network, the performance requirements for a DL-RS-based approach can be relaxed. This means that a relatively sparse DL-RS configuration may still be used to estimate the drift.

This permits a hybrid approach leveraging both approaches which can complement each other, resulting in a robust mechanism for autonomous timing and frequency update.

In one embodiment, the UE uses a hybrid approach to obtain the TA value for autonomous TA update. It uses both approaches, i.e., DL-RS to evaluate the timing drift as well as the information sent by the network (using one or more approaches in the Timing Correction or Joint Timing and Frequency Drift Update sections as described above) about timing drift. For example, the network information may help improve performance of the DL-RS based tracking without resorting to a denser DL-RS configuration.

In another embodiment, the UE uses a hybrid approach to obtain the frequency drift for autonomous frequency correction. It uses both approaches, i.e., DL-RS to evaluate the frequency drift as wells as information sent by the network (using one or more approaches described in the Frequency Correction, Timing Correction, Joint Timing and Frequency Drift Update sections above) about frequency drift. For example, the network information may help improve performance of the DL-RS based tracking without resorting to a denser DL-RS configuration.

In another embodiment, the UE uses a hybrid approach to obtain the timing drift and the frequency drift for autonomous timing and frequency correction. It uses both approaches, i.e., DL-RS to evaluate the timing/frequency drift as well as information sent by the network (using one or more approaches in described in the Frequency Correction, Timing Correction, Joint Timing and Frequency Drift Update sections included above) about timing/frequency drift. For example, the network information may help improve performance of the DL-RS based timing/frequency tracking without resorting to a denser DL-RS configuration.

As another example, the UE may use a weighted average or other filtering or mathematical function of the timing/frequency drift or timing/frequency correction obtained from the two approaches. In some instances, the weights can be signaled by the network to the UE using system information or dedicated signaling.

In a related embodiment, the network may indicate whether the UE should use the hybrid approach or not. This may be done using system information or dedicated UE signaling.

V. Additional Description

FIGS. 5A, 5B, 5C, 5D, 5E, 5F, and 5G are flowcharts depicting embodiments of the present disclosure that provide for compensation for Doppler effects that occur when a wireless device (UE) communicates with an NTN. Embodiments of the methods shown in FIGS. 5A, 5B, 5C, 5D, 5E, 5F, and 5G may include computer readable instructions that can be executed by a controller or processing device of a wireless device or a base station or other network node as described herein. Other embodiments include wireless devices and network nodes configured to perform the operations included in the illustrated methods.

Figure 5B:
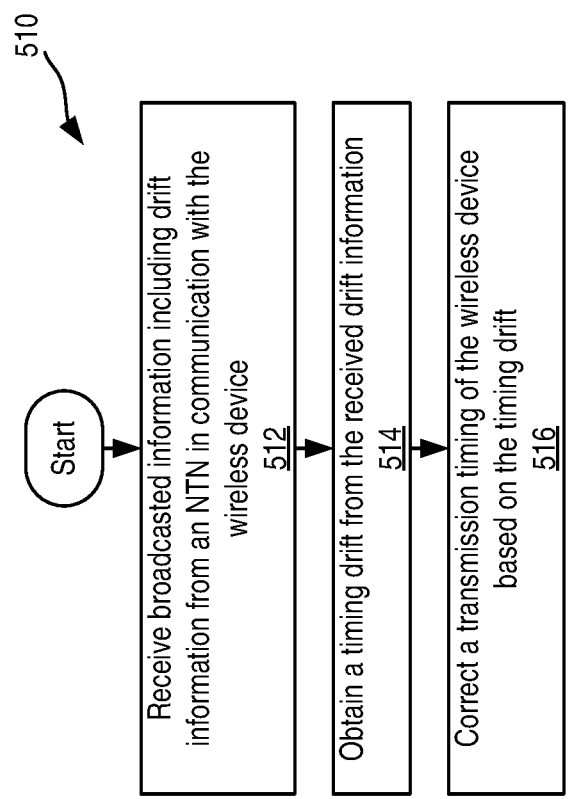
Figure 5A:
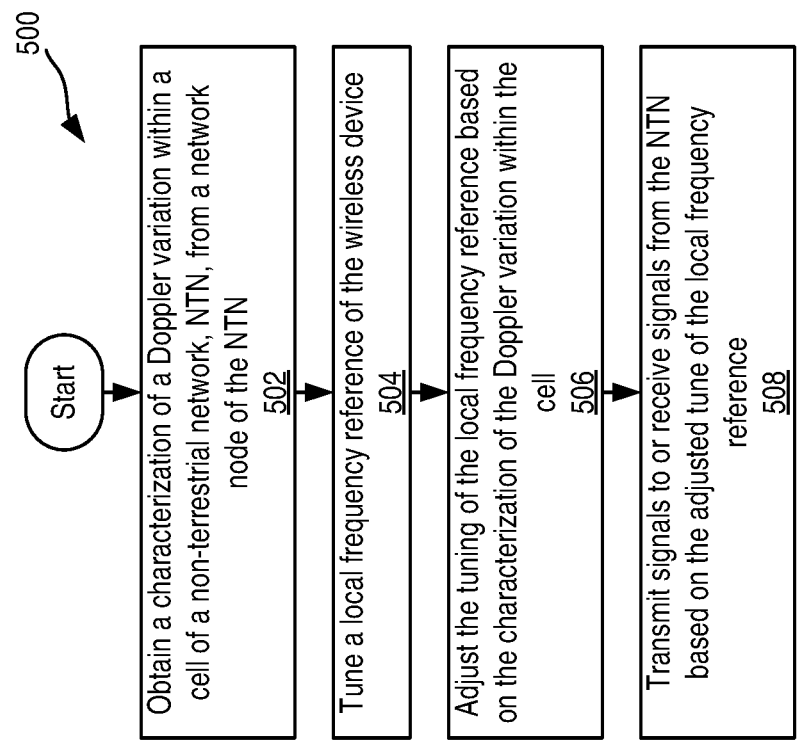

The method 500 shown in FIG. 5A may be performed by a wireless device performing the operations of: (502) obtaining a characterization of a Doppler variation rate within a cell of an NTN from a network node of the NTN; (504) tuning a local frequency reference of the wireless device; (506) adjusting the tuning of the local frequency reference based on the characterization of the Doppler variation rate within the cell; and (508) transmitting signals to or receiving signals from the NTN based on the adjusted tune of the local frequency reference.

The method 510 shown in FIG. 5B may be performed by a wireless device and may include: (512) receiving broadcasted information including drift information from an NTN in communication with the wireless device; (514) obtaining a timing drift from the received drift information; and (516) correcting a transmission timing of the wireless device based on the timing drift.

The method 520 shown in FIG. 5C may be performed by a wireless device and may include: (522) entering a connected mode with an NTN in communication with the wireless device; (524) receiving information that is specific to the wireless device from the NTN; (526) obtaining a timing drift from the received drift information; and (528) correcting a transmission timing or receipt timing of the wireless device based on the timing drift.

The method 530 shown in FIG. 5D may be performed by a wireless device and may include: (532) receiving drift information from an NTN in communication from the wireless device; (534) obtaining a timing drift from the received drift information; (536) obtaining a frequency drift from the received drift information; and (538) correcting a transmission timing or receipt timing of the wireless device based on the timing drift and/or correcting a transmission frequency or receipt frequency of the wireless device based on the frequency drift.

Figure 5E:
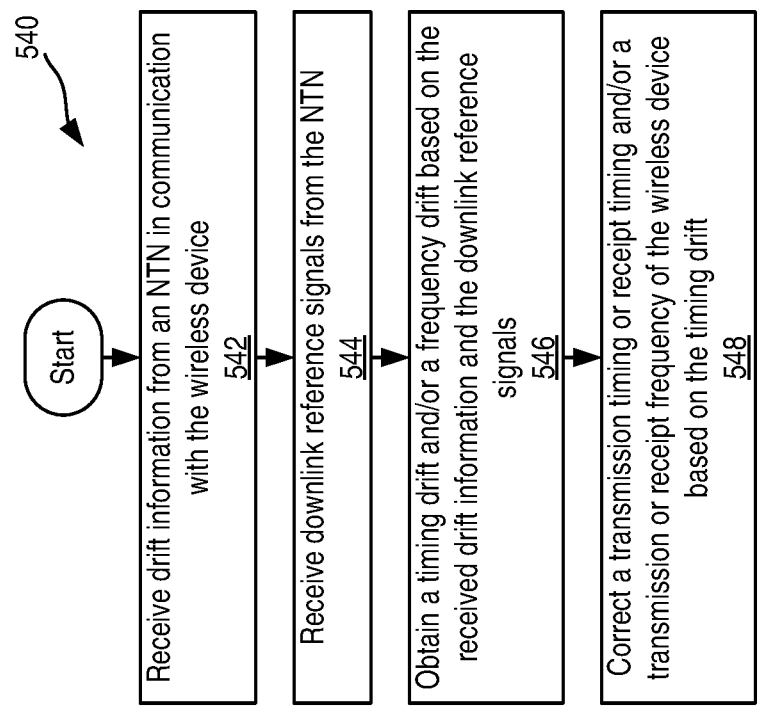

The method 540 shown in FIG. 5E may be performed by a wireless device and may include: (542) receiving drift information from an NTN in communication with the wireless device; (544) receiving DL-RSs from the NTN; (546) obtaining a timing drift and/or a frequency drift based on the received drift information and the DL-RSs; and (548) correcting a transmission or receipt timing and/or a transmission or receipt frequency of the wireless device based on the timing drift.

Figure 5F:
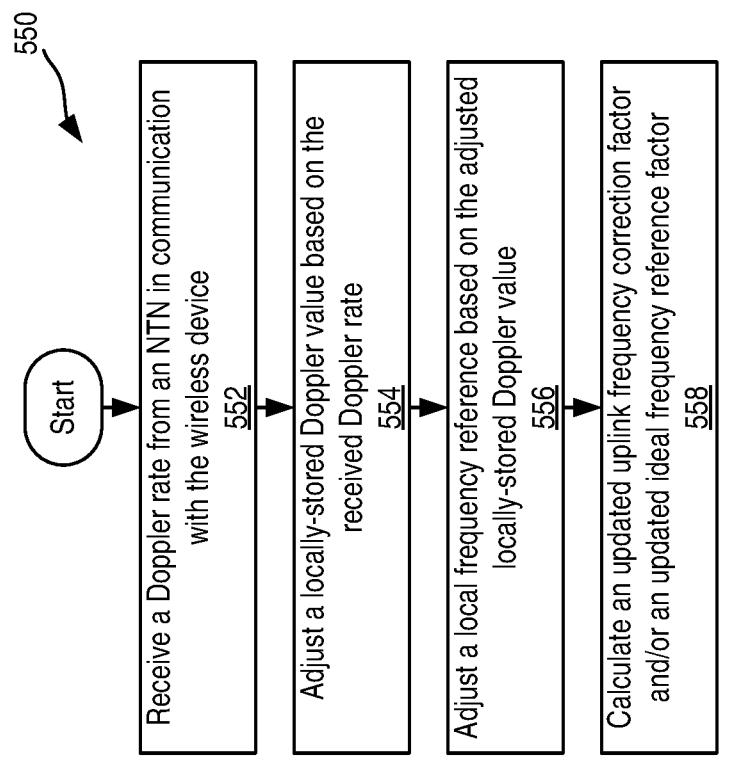

The method 550 shown in FIG. 5F may be performed by a wireless device and may include: (552) receiving a Doppler rate from an NTN in communication with the wireless device; (554) adjusting a locally-stored Doppler value based on the received Doppler rate; (556) adjusting a local frequency reference based on the adjusted locally-stored Doppler value; and (558) calculates an updated uplink frequency correction factor and/or an updated ideal frequency reference factor.

Figure 5G:
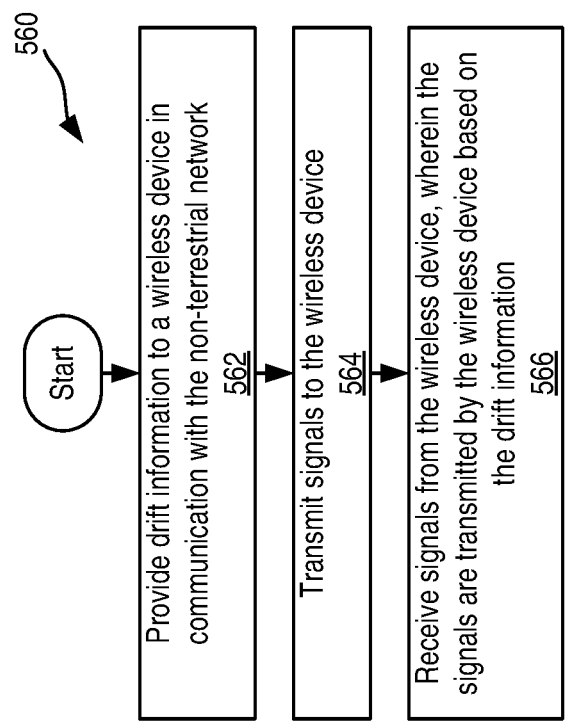
FIG. 5G is a flowchart of a method performed by a network node of an NTN in accordance with some embodiments of the present disclosure.

The method 560 shown in FIG. 5G may be performed by a network node of an NTN and may include: (562) providing drift information to a wireless device in communication with the NTN; (564) transmitting signals to the wireless device; and (566) receiving signals from the wireless device, wherein the signals are transmitted by the wireless device based on the drift information.

Embodiments of the methods 500, 510, 520, 530, 540, 550, and 560 may be modified in view of other parts of the disclosure to include described features to improve delay and Doppler variations in NTNs.

Figure 6:
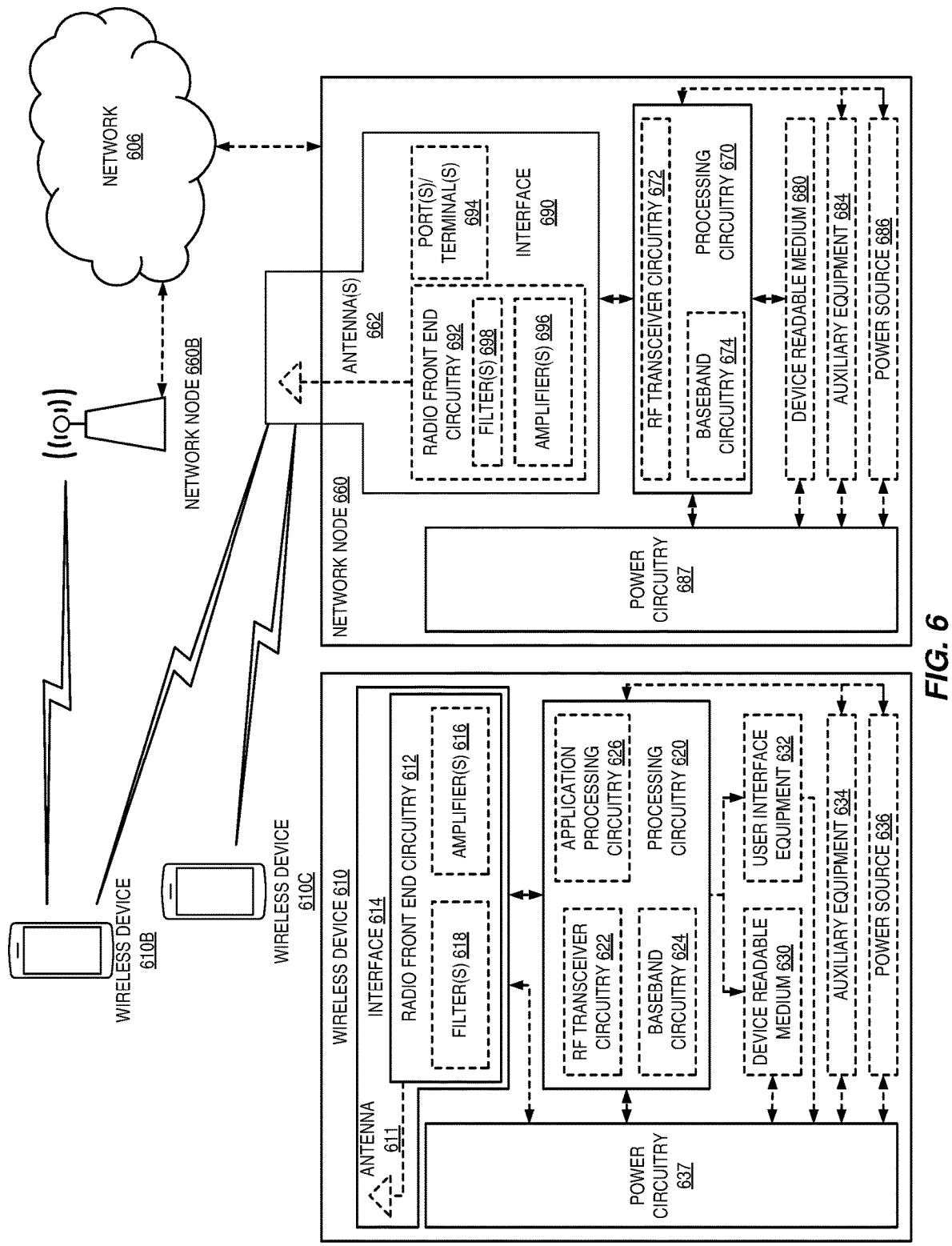
FIG. 6 depicts a wireless network in accordance with some embodiments of the present disclosure.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts a network 606, network nodes 660 and 660b, and wireless devices 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

The network 606 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 660 and the wireless device 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, APs (e.g., radio access points), base stations (e.g., radio base stations, Node Bs, eNBs, and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or RRUs, sometimes referred to as RRHs. Such RRUs may or may not be integrated with an antenna as an antenna integrated radio. Parts of a distributed radio base station may also be referred to as nodes in a DAS. Yet further examples of network nodes include MSR equipment such as MSR base stations, network controllers such as RNCs or BSCs, BTSs, transmission points, transmission nodes, MCEs, core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, the network node 660 includes processing circuitry 670, a device readable medium 680, an interface 690, auxiliary equipment 684, a power source 686, power circuitry 687, and an antenna 662. Although the network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 660 are depicted as single boxes located within a larger box, or nested within multiple boxes, in practice a network node may comprise multiple different physical components that make up a single illustrated component (e.g., the device readable medium 680 may comprise multiple separate hard drives as well as multiple Random Access Memory (RAM) modules).

Similarly, the network node 660 may be composed of multiple physically separate components (e.g., a Node B component and an RNC component, or a BTS component and a BSC component, etc.), which may each have their own respective components. In certain scenarios in which the network node 660 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 660 may be configured to support multiple Radio Access Technologies (RATs). In such embodiments, some components may be duplicated (e.g., a separate device readable medium 680 for the different RATs) and some components may be reused (e.g., the same antenna 662 may be shared by the RATs). The network node 660 may also include multiple sets of the various illustrated components for different wireless technologies integrated into the network node 660, such as, for example, GSM, WCDMA, LTE, NR, WiFi, or Bluetooth wireless technologies. These wireless technologies may be integrated into the same or different chip or set of chips and other components within the network node 660.

The processing circuitry 670 is configured to perform any determining, calculating, or similar operations (e.g., certain obtaining operations) described herein as being provided by a network node. These operations performed by the processing circuitry 670 may include processing information obtained by the processing circuitry 670 by, for example, converting the obtained information into other information, comparing the obtained information or converted information to information stored in the network node, and/or performing one or more operations based on the obtained information or converted information, and as a result of said processing making a determination.

The processing circuitry 670 may comprise a combination of one or more of a microprocessor, controller, microcontroller, Central Processing Unit (CPU), Digital Signal Processor (DSP), Application Specific Integrated Circuit (ASIC), Field Programmable Gate Array (FPGA), or any other suitable computing device, resource, or combination of hardware, software, and/or encoded logic operable to provide, either alone or in conjunction with other network node 660 components, such as the device readable medium 680, network node 660 functionality. For example, the processing circuitry 670 may execute instructions stored in the device readable medium 680 or in memory within the processing circuitry 670. Such functionality may include providing any of the various wireless features, functions, or benefits discussed herein. In some embodiments, the processing circuitry 670 may include a System on a Chip (SOC).

In some embodiments, the processing circuitry 670 may include one or more of Radio Frequency (RF) transceiver circuitry 672 and baseband processing circuitry 674. In some embodiments, the RF transceiver circuitry 672 and baseband processing circuitry 674 may be on separate chips (or sets of chips), boards, or units, such as radio units and digital units. In alternative embodiments, part or all of the RF transceiver circuitry 672 and the baseband processing circuitry 674 may be on the same chip or set of chips, boards, or units In certain embodiments, some or all of the functionality described herein as being provided by a network node, base station, eNB, or other such network device may be performed by the processing circuitry 670 executing instructions stored on the device readable medium 680 or memory within the processing circuitry 670. In alternative embodiments, some or all of the functionality may be provided by the processing circuitry 670 without executing instructions stored on a separate or discrete device readable medium, such as in a hard-wired manner In any of those embodiments, whether executing instructions stored on a device readable storage medium or not, the processing circuitry 670 can be configured to perform the described functionality. The benefits provided by such functionality are not limited to the processing circuitry 670 alone or to other components of the network node 660, but are enjoyed by the network node 660 as a whole, and/or by end users and the wireless network generally.

The device readable medium 680 may comprise any form of volatile or non-volatile computer readable memory including, without limitation, persistent storage, solid-state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 670. The device readable medium 680 may store any suitable instructions, data or information, including a computer program, software, an application including one or more of logic, rules, code, tables, etc. and/or other instructions capable of being executed by the processing circuitry 670 and utilized by network node 660. The device readable medium 680 may be used to store any calculations made by the processing circuitry 670 and/or any data received via the interface 690. In some embodiments, the processing circuitry 670 and the device readable medium 680 may be considered to be integrated.

The interface 690 is used in the wired or wireless communication of signaling and/or data between the network node 660, the network 606, and/or the wireless devices 610. As illustrated, the interface 690 comprises port(s)/terminal(s) 694 to send and receive data, for example to and from the network 606 over a wired connection. The interface 690 also includes radio front end circuitry 692 that may be coupled to, or in certain embodiments a part of, the antenna 662. The radio front end circuitry 692 comprises filters 698 and amplifiers 696. The radio front end circuitry 692 may be connected to the antenna 662 and the processing circuitry 670. The radio front end circuitry 692 may be configured to condition signals communicated between the antenna 662 and the processing circuitry 670. The radio front end circuitry 692 may receive digital data that is to be sent out to other network nodes or wireless devices via a wireless connection. The radio front end circuitry 692 may convert the digital data into a radio signal having the appropriate channel and bandwidth parameters using a combination of filters 698 and/or amplifiers 696. The radio signal may then be transmitted via the antenna 662. Similarly, when receiving data, the antenna 662 may collect radio signals which are then converted into digital data by the radio front end circuitry 692. The digital data may be passed to the processing circuitry 670. In other embodiments, the interface 690 may comprise different components and/or different combinations of components.

In certain alternative embodiments, the network node 660 may not include separate radio front end circuitry 692; instead, the processing circuitry 670 may comprise radio front end circuitry and may be connected to the antenna 662 without separate radio front end circuitry 692. Similarly, in some embodiments, all or some of the RF transceiver circuitry 672 may be considered a part of the interface 690. In still other embodiments, the interface 690 may include one or more ports or terminals 694, the radio front end circuitry 692, and the RF transceiver circuitry 672, as part of a radio unit (not shown), and the interface 690 may communicate with the baseband processing circuitry 674, which is part of a digital unit (not shown).

The antenna 662 may include one or more antennas, or antenna arrays, configured to send and/or receive wireless signals. The antenna 662 may be coupled to the radio front end circuitry 690 and may be any type of antenna capable of transmitting and receiving data and/or signals wirelessly. In some embodiments, the antenna 662 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 662 may be separate from the network node 660 and may be connectable to the network node 660 through an interface or port.

The antenna 662, interface 690, and/or processing circuitry 670 may be configured to perform any receiving operations and/or certain obtaining operations described herein as being performed by a network node. Any information, data, and/or signals may be received from a wireless device, another network node and/or any other network equipment. Similarly, the antenna 662, interface 690, and/or processing circuitry 670 may be configured to perform any transmitting operations described herein as being performed by a network node. Any information, data, and/or signals may be transmitted to a wireless device, another network node, and/or any other network equipment.

The power circuitry 687 may comprise, or be coupled to, power management circuitry and is configured to supply the components of the network node 660 with power for performing the functionality described herein. The power circuitry 687 may receive power from the power source 686. The power source 686 and/or power circuitry 687 may be configured to provide power to the various components of the network node 660 in a form suitable for the respective components (e.g., at a voltage and current level needed for each respective component). The power source 686 may either be included in, or be external to, the power circuitry 687 and/or the network node 660. For example, the network node 660 may be connectable to an external power source (e.g., an electricity outlet) via an input circuitry or interface such as an electrical cable, whereby the external power source supplies power to the power circuitry 687. As a further example, the power source 686 may comprise a source of power in the form of a battery or battery pack which is connected to, or integrated in, the power circuitry 687. The battery may provide backup power should the external power source fail. Other types of power sources, such as photovoltaic devices, may also be used.

Alternative embodiments of the network node 660 may include additional components beyond those shown in FIG. 6 that may be responsible for providing certain aspects of the network node's functionality, including any of the functionality described herein and/or any functionality necessary to support the subject matter described herein. For example, the network node 660 may include user interface equipment to allow input of information into the network node 660 and to allow output of information from the network node 660. This may allow a user to perform diagnostic, maintenance, repair, and other administrative functions for the network node 660.

As used herein, wireless device refers to a device capable, configured, arranged, and/or operable to communicate wirelessly with network nodes and/or other wireless devices. Unless otherwise noted, the term wireless device may be used interchangeably herein with UE. Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a Voice over IP (VoIP) phone, a wireless local loop phone, a desktop computer, a Personal Digital Assistant (PDA), a wireless cameras, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE). a vehicle-mounted wireless terminal device, etc. A wireless device may support Device-to-Device (D2D) communication, for example by implementing a 3G Partnership Project (3GPP) standard for sidelink communication, Vehicle-to-Vehicle (V2V), Vehicle-to-Infrastructure (V2I), Vehicle-to-Everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a Machine-to-Machine (M2M) device, which may in a 3GPP context be referred to as a Machine Type Communication (MTC) device. As one particular example, the wireless device may be a UE implementing the 3GPP Narrowband IoT (NB-IoT) standard. Particular examples of such machines or devices are sensors, metering devices such as power meters, industrial machinery, or home or personal appliances (e.g., refrigerators, televisions, etc.) or personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, the wireless device 610 includes an antenna 611, an interface 614, processing circuitry 620, a device readable medium 630, user interface equipment 632, auxiliary equipment 634, a power source 636, and power circuitry 637. The wireless device 610 may include multiple sets of one or more of the illustrated components for different wireless technologies supported by the wireless device 610, such as, for example, GSM, Wideband Code Division Multiple Access (WCDMA), LTE, NR, WiFi, WiMax, or Bluetooth wireless technologies, just to mention a few. These wireless technologies may be integrated into the same or different chips or set of chips as other components within the wireless device 610.

The antenna 611 may include one or more antennas or antenna arrays configured to send and/or receive wireless signals, and is connected to the interface 614. In certain alternative embodiments, the antenna 611 may be separate from the wireless device 610 and may be connectable to the wireless device 610 through an interface or port. The antenna 611, interface 614, and/or processing circuitry 620 may be configured to perform any receiving or transmitting operations described herein as being performed by a wireless device. Any information, data, and/or signals may be received from a network node and/or another wireless device. In some embodiments, radio front end circuitry and/or the antenna 611 may be considered an interface.

As illustrated, the interface 614 comprises the radio front end circuitry 612 and the antenna 611. The radio front end circuitry 612 comprises one or more filters 618 and amplifiers 616. The radio front end circuitry 614 is connected to the antenna 611 and the processing circuitry 620, and is configured to condition signals communicated between the antenna 611 and the processing circuitry 620. The radio front end circuitry 612 may be coupled to or a part of the antenna 611. In some embodiments, the wireless device 610 may not include separate radio front end circuitry 612; rather, the processing circuitry 620 may comprise radio front end circuitry and may be connected to the antenna 611. Similarly, in some embodiments, some or all of the RF transceiver circuitry 622 may be considered a part of the interface 614. The radio front end circuitry 612 may receive digital data that is to be sent out to other network nodes or wireless devices via a wireless connection. The radio front end circuitry 612 may convert the digital data into a radio signal having the appropriate channel and bandwidth parameters using a combination of filters 618 and/or amplifiers 616. The radio signal may then be transmitted via the antenna 611. Similarly, when receiving data, the antenna 611 may collect radio signals which are then converted into digital data by the radio front end circuitry 612. The digital data may be passed to the processing circuitry 620. In other embodiments, the interface 614 may comprise different components and/or different combinations of components.

The processing circuitry 620 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other wireless device 610 components, such as the device readable medium 630, wireless device 610 functionality. Such functionality may include providing any of the various wireless features or benefits discussed herein. For example, the processing circuitry 620 may execute instructions stored in the device readable medium 630 or in memory within the processing circuitry 620 to provide the functionality disclosed herein.

As illustrated, the processing circuitry 620 includes one or more of RF transceiver circuitry 622, baseband processing circuitry 624, and application processing circuitry 626. In other embodiments, the processing circuitry 620 may comprise different components and/or different combinations of components. In certain embodiments the processing circuitry 620 of the wireless device 610 may comprise a SOC. In some embodiments, the RF transceiver circuitry 622, baseband processing circuitry 624, and application processing circuitry 626 may be on separate chips or sets of chips. In alternative embodiments, part or all of the baseband processing circuitry 624 and application processing circuitry 626 may be combined into one chip or set of chips, and the RF transceiver circuitry 622 may be on a separate chip or set of chips. In still alternative embodiments, part or all of the RF transceiver circuitry 622 and baseband processing circuitry 624 may be on the same chip or set of chips, and the application processing circuitry 626 may be on a separate chip or set of chips. In yet other alternative embodiments, part or all of the RF transceiver circuitry 622, baseband processing circuitry 624, and application processing circuitry 626 may be combined in the same chip or set of chips. In some embodiments, the RF transceiver circuitry 622 may be a part of the interface 614. The RF transceiver circuitry 622 may condition RF signals for the processing circuitry 620.

In certain embodiments, some or all of the functionality described herein as being performed by a wireless device may be provided by the processing circuitry 620 executing instructions stored on the device readable medium 630, which in certain embodiments may be a computer-readable storage medium. In alternative embodiments, some or all of the functionality may be provided by the processing circuitry 620 without executing instructions stored on a separate or discrete device readable storage medium, such as in a hard-wired manner In any of those particular embodiments, whether executing instructions stored on a device readable storage medium or not, the processing circuitry 620 can be configured to perform the described functionality. The benefits provided by such functionality are not limited to the processing circuitry 620 alone or to other components of the wireless device 610, but are enjoyed by the wireless device 610 as a whole, and/or by end users and the wireless network generally.

The processing circuitry 620 may be configured to perform any determining, calculating, or similar operations (e.g., certain obtaining operations) described herein as being performed by a wireless device. These operations, as performed by the processing circuitry 620, may include processing information obtained by the processing circuitry 620 by, for example, converting the obtained information into other information, comparing the obtained information or converted information to information stored by the wireless device 610, and/or performing one or more operations based on the obtained information or converted information, and as a result of said processing making a determination.

The device readable medium 630 may be operable to store a computer program, software, an application including one or more of logic, rules, code, tables, etc., and/or other instructions capable of being executed by the processing circuitry 620. The device readable medium 630 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 620. In some embodiments, the processing circuitry 620 and the device readable medium 630 may be considered to be integrated.

The user interface equipment 632 may provide components that allow for a human user to interact with the wireless device 610. Such interaction may be of many forms, such as visual, audial, tactile, etc. The user interface equipment 632 may be operable to produce output to the user and to allow the user to provide input to the wireless device 610. The type of interaction may vary depending on the type of user interface equipment 632 installed in the wireless device 610. For example, if the wireless device 610 is a smart phone, the interaction may be via a touch screen; if the wireless device 610 is a smart meter, the interaction may be through a screen that provides usage (e.g., the number of gallons used) or a speaker that provides an audible alert (e.g., if smoke is detected). The user interface equipment 632 may include input interfaces, devices and circuits, and output interfaces, devices and circuits. The user interface equipment 632 is configured to allow input of information into the wireless device 610, and is connected to the processing circuitry 620 to allow the processing circuitry 620 to process the input information. The user interface equipment 632 may include, for example, a microphone, a proximity or other sensor, keys/buttons, a touch display, one or more cameras, a Universal Serial Bus (USB) port, or other input circuitry. The user interface equipment 632 is also configured to allow output of information from the wireless device 610, and to allow the processing circuitry 620 to output information from the wireless device 610. The user interface equipment 632 may include, for example, a speaker, a display, vibrating circuitry, a USB port, a headphone interface, or other output circuitry. Using one or more input and output interfaces, devices, and circuits, of user interface equipment 632, the wireless device 610 may communicate with end users and/or the wireless network, and allow them to benefit from the functionality described herein.

The auxiliary equipment 634 is operable to provide more specific functionality which may not be generally performed by wireless devices. This may comprise specialized sensors for doing measurements for various purposes, interfaces for additional types of communication such as wired communications, etc. The inclusion and type of components of the auxiliary equipment 634 may vary depending on the embodiment and/or scenario.

The power source 636 may, in some embodiments, be in the form of a battery or battery pack. Other types of power sources, such as an external power source (e.g., an electricity outlet), photovoltaic devices or power cells, may also be used. The wireless device 610 may further comprise power circuitry 637 for delivering power from the power source 636 to the various parts of the wireless device 610 which need power from the power source 636 to carry out any functionality described or indicated herein. The power circuitry 637 may in certain embodiments comprise power management circuitry. The power circuitry 637 may additionally or alternatively be operable to receive power from an external power source, in which case wireless device 610 may be connectable to the external power source (such as an electricity outlet) via input circuitry or an interface such as an electrical power cable. The power circuitry 637 may also in certain embodiments be operable to deliver power from an external power source to the power source 636. This may be, for example, for the charging of the power source 636. The power circuitry 637 may perform any formatting, converting, or other modification to the power from the power source 636 to make the power suitable for the respective components of the wireless device 610 to which power is supplied.

Figure 7:
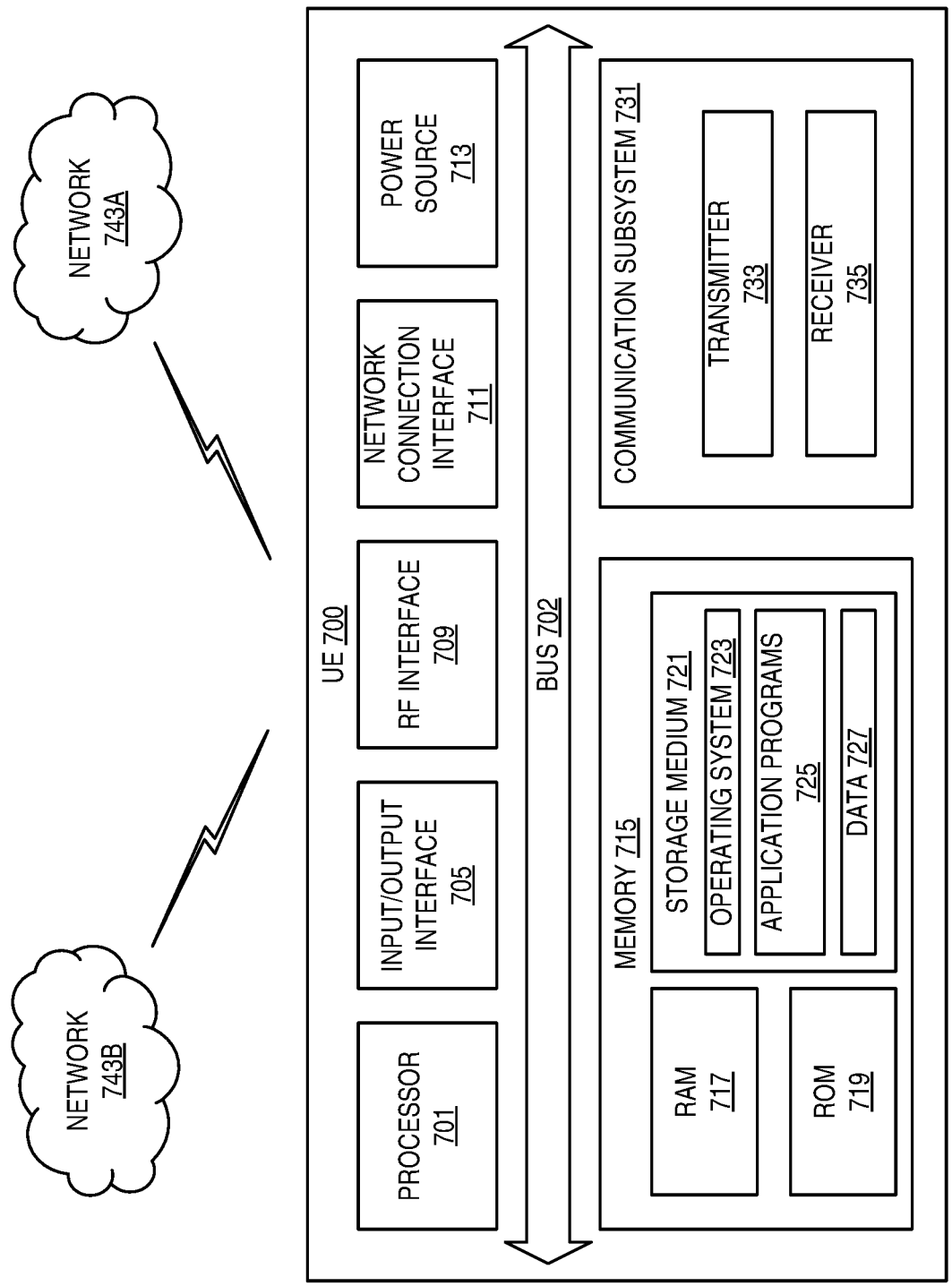
FIG. 7 depicts a User Equipment (UE) in accordance with some embodiments of the present disclosure.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 7200 may be any UE identified by the 3GPP, including a NB-IoT UE, a MTC UE, and/or an enhanced MTC (eMTC) UE. The UE 700, as illustrated in FIG. 7, is one example of a wireless device configured for communication in accordance with one or more communication standards promulgated by the 3GPP, such as 3GPP's GSM, UMTS, LTE, and/or 5G standards. As mentioned previously, the term wireless device and UE may be used interchangeably. Accordingly, although FIG. 7 is a UE, the components discussed herein are equally applicable to a wireless device, and vice-versa.

In FIG. 7, the UE 700 includes processing circuitry 701 that is operatively coupled to an input/output interface 705, an RF interface 709, a network connection interface 711, memory 715 including RAM 717, ROM 719, and a storage medium 721 or the like, a communication subsystem 731, a power source 733, and/or any other component, or any combination thereof. The storage medium 721 includes an operating system 723, an application program 725, and data 727. In other embodiments, the storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, the processing circuitry 701 may be configured to process computer instructions and data. The processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 701 may include two CPUs. Data may be information in a form suitable for use by a computer.

In the depicted embodiment, the input/output interface 705 may be configured to provide a communication interface to an input device, output device, or input and output device. The UE 700 may be configured to use an output device via the input/output interface 705. An output device may use the same type of interface port as an input device.

For example, a USB port may be used to provide input to and output from the UE 700. The output device may be a speaker, a sound card, a video card, a display, a monitor, a printer, an actuator, an emitter, a smartcard, another output device, or any combination thereof. The UE 700 may be configured to use an input device via the input/output interface 705 to allow a user to capture information into the UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, the RF interface 709 may be configured to provide a communication interface to RF components such as a transmitter, a receiver, and an antenna. The network connection interface 711 may be configured to provide a communication interface to a network 743*a*. The network 743*a* may encompass wired and/or wireless networks such as a LAN, a WAN, a computer network, a wireless network, a telecommunications network, another like network or any combination thereof. For example, the network 743*a* may comprise a WiFi network. The network connection interface 711 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 711 may implement receiver and transmitter functionality appropriate to the communication network links (e.g., optical, electrical, and the like). The transmitter and receiver functions may share circuit components, software, or firmware, or alternatively may be implemented separately.

The RAM 717 may be configured to interface via the bus 702 to the processing circuitry 701 to provide storage or caching of data or computer instructions during the execution of software programs such as the operating system, application programs, and device drivers. The ROM 719 may be configured to provide computer instructions or data to the processing circuitry 701. For example, the ROM 719 may be configured to store invariant low-level system code or data for basic system functions such as basic input and output (I/O), startup, or reception of keystrokes from a keyboard that are stored in a non-volatile memory. The storage medium 721 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 721 may be configured to include an operating system 723, an application program 725 such as a web browser application, a widget or gadget engine or another application, and a data file 727. The storage medium 721 may store, for use by the UE 700, any of a variety of various operating systems or combinations of operating systems.

The storage medium 721 may be configured to include a number of physical drive units, such as Redundant Array of Independent Disks (RAID), floppy disk drive, flash memory, USB flash drive, external hard disk drive, thumb drive, pen drive, key drive, High-Density Digital Versatile Disc (HD-DVD) optical disc drive, internal hard disk drive, Blu-Ray optical disc drive, Holographic Digital Data Storage (HDDS) optical disc drive, external mini Dual In-line Memory Module (DIMM), Synchronous Dynamic RAM (SDRAM), external micro-DIMM SDRAM, smartcard memory such as a Subscriber Identity Module (SIM) or a Removable User Identity Module (RUIM), other memory, or any combination thereof. The storage medium 721 may allow the UE 700 to access computer-executable instructions, application programs or the like, stored on transitory or non-transitory memory media, to off-load data, or to upload data. An article of manufacture, such as one utilizing a communication system may be tangibly embodied in the storage medium 721, which may comprise a device readable medium.

In FIG. 7, the processing circuitry 701 may be configured to communicate with a network 743*b* using a communication subsystem 731. The network 743*a* and the network 743*b* may be the same network or networks or different network or networks. The communication subsystem 731 may be configured to include one or more transceivers used to communicate with the network 743*b*. For example, the communication subsystem 731 may be configured to include one or more transceivers used to communicate with one or more remote transceivers of another device capable of wireless communication such as another wireless device, UE, or base station of a Radio Access Network (RAN) according to one or more communication protocols, such as IEEE 802.11, Code Division Multiple Access (CDMA), WCDMA, GSM, LTE, Universal Terrestrial Radio Access Network (UTRAN), WiMax, or the like. Each transceiver may include a transmitter 733 and/or a receiver 735 to implement transmitter or receiver functionality, respectively, appropriate to the RAN links (e.g., frequency allocations and the like). Further, the transmitter 733 and the receiver 735 of each transceiver may share circuit components, software or firmware, or alternatively may be implemented separately.

In the illustrated embodiment, the communication functions of the communication subsystem 731 may include data communication, voice communication, multimedia communication, short-range communications such as Bluetooth, near-field communication, location-based communication such as the use of the GPS to determine a location, another like communication function, or any combination thereof. For example, the communication subsystem 731 may include cellular communication, WiFi communication, Bluetooth communication, and GPS communication. The network 743*b* may encompass wired and/or wireless networks such as a LAN, a WAN, a computer network, a wireless network, a telecommunications network, another like network or any combination thereof. For example, the network 743*b* may be a cellular network, a WiFi network, and/or a near-field network. The power source 713 may be configured to provide Alternating Current (AC) or Direct Current (DC) power to components of the UE 700.

The features, benefits, and/or functions described herein may be implemented in one of the components of the UE 700 or partitioned across multiple components of the UE 700. Further, the features, benefits, and/or functions described herein may be implemented in any combination of hardware, software, or firmware. In one example, the communication subsystem 731 may be configured to include any of the components described herein. Further, the processing circuitry 701 may be configured to communicate with any of such components over the bus 702. In another example, any of such components may be represented by program instructions stored in memory that when executed by the processing circuitry 701 perform the corresponding functions described herein. In another example, the functionality of any of such components may be partitioned between the processing circuitry 701 and the communication subsystem 731. In another example, the non-computationally intensive functions of any of such components may be implemented in software or firmware and the computationally intensive functions may be implemented in hardware.

Figure 8:
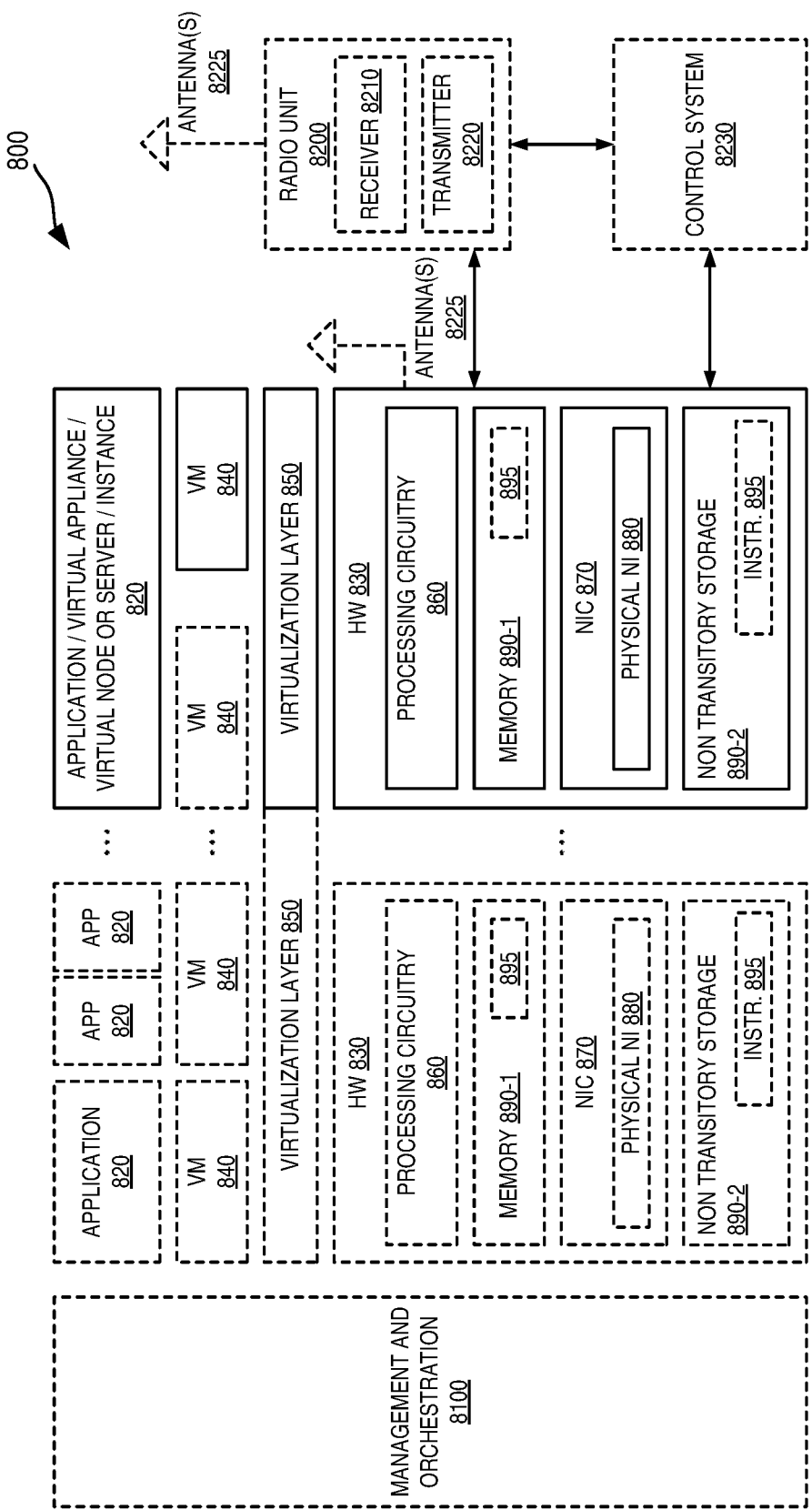
FIG. 8 depicts a virtualization environment in accordance with some embodiments of the present disclosure.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in the virtualization environment 800 which provides hardware 830 comprising processing circuitry 860 and memory 890. The memory 890 contains instructions 895 executable by the processing circuitry 860 whereby the application 820 is operative to provide one or more of the features, benefits, and/or functions disclosed herein.

The virtualization environment 800, comprises general-purpose or special-purpose network hardware devices 830 comprising a set of one or more processors or processing circuitry 860, which may be Commercial Off-The-Shelf (COTS) processors, dedicated ASICs, or any other type of processing circuitry including digital or analog hardware components or special purpose processors. Each hardware device may comprise memory 890-1 which may be non-persistent memory for temporarily storing instructions 895 or software executed by the processing circuitry 860. Each hardware device may comprise one or more Network Interface Controllers (NICs) 870, also known as network interface cards, which include a physical network interface 880. Each hardware device may also include non-transitory, persistent, machine-readable storage media 890-2 having stored therein software 895 and/or instructions executable by the processing circuitry 860. The software 895 may include any type of software including software for instantiating one or more virtualization layers 850 (also referred to as hypervisors), software to execute virtual machines 840 as well as software allowing it to execute functions, features and/or benefits described in relation with some embodiments described herein.

The virtual machines 840, comprise virtual processing, virtual memory, virtual networking or interface and virtual storage, and may be run by a corresponding virtualization layer 850 or hypervisor. Different embodiments of the instance of the virtual appliance 820 may be implemented on one or more of virtual machines 840, and the implementations may be made in different ways.

During operation, the processing circuitry 860 executes the software 895 to instantiate the hypervisor or virtualization layer 850, which may sometimes be referred to as a Virtual Machine Monitor (VMM). The virtualization layer 850 may present a virtual operating platform that appears like networking hardware to the virtual machine 840.

As shown in FIG. 8, the hardware 830 may be a stand-alone network node with generic or specific components. The hardware 830 may comprise an antenna 8225 and may implement some functions via virtualization. Alternatively, the hardware 830 may be part of a larger cluster of hardware (e.g., such as in a data center or CPE) where many hardware nodes work together and are managed via a Management and Orchestration (MANO) 8100, which, among others, oversees lifecycle management of the applications 820.

Virtualization of the hardware is in some contexts referred to as Network Function Virtualization (NFV). NFV may be used to consolidate many network equipment types onto industry standard high volume server hardware, physical switches, and physical storage, which can be located in data centers, and customer premise equipment.

In the context of NFV, the virtual machine 840 may be a software implementation of a physical machine that runs programs as if they were executing on a physical, non-virtualized machine. Each of the virtual machines 840, and that part of the hardware 830 that executes that virtual machine, be it hardware dedicated to that virtual machine and/or hardware shared by that virtual machine with others of the virtual machines 840, forms a separate Virtual Network Element (VNE).

Still in the context of NFV, Virtual Network Function (VNF) is responsible for handling specific network functions that run in one or more virtual machines 840 on top of the hardware networking infrastructure 830 and corresponds to the application 820 in FIG. 8.

In some embodiments, one or more radio units 8200 that each include one or more transmitters 8220 and one or more receivers 8210 may be coupled to one or more antennas 8225. The radio units 8200 may communicate directly with the hardware nodes 830 via one or more appropriate network interfaces and may be used in combination with the virtual components to provide a virtual node with radio capabilities, such as a radio access node or a base station.

In some embodiments, some signaling can be effected with the use of the control system 8230 which may alternatively be used for communication between the hardware nodes 830 and the radio units 8200.

Figure 9:
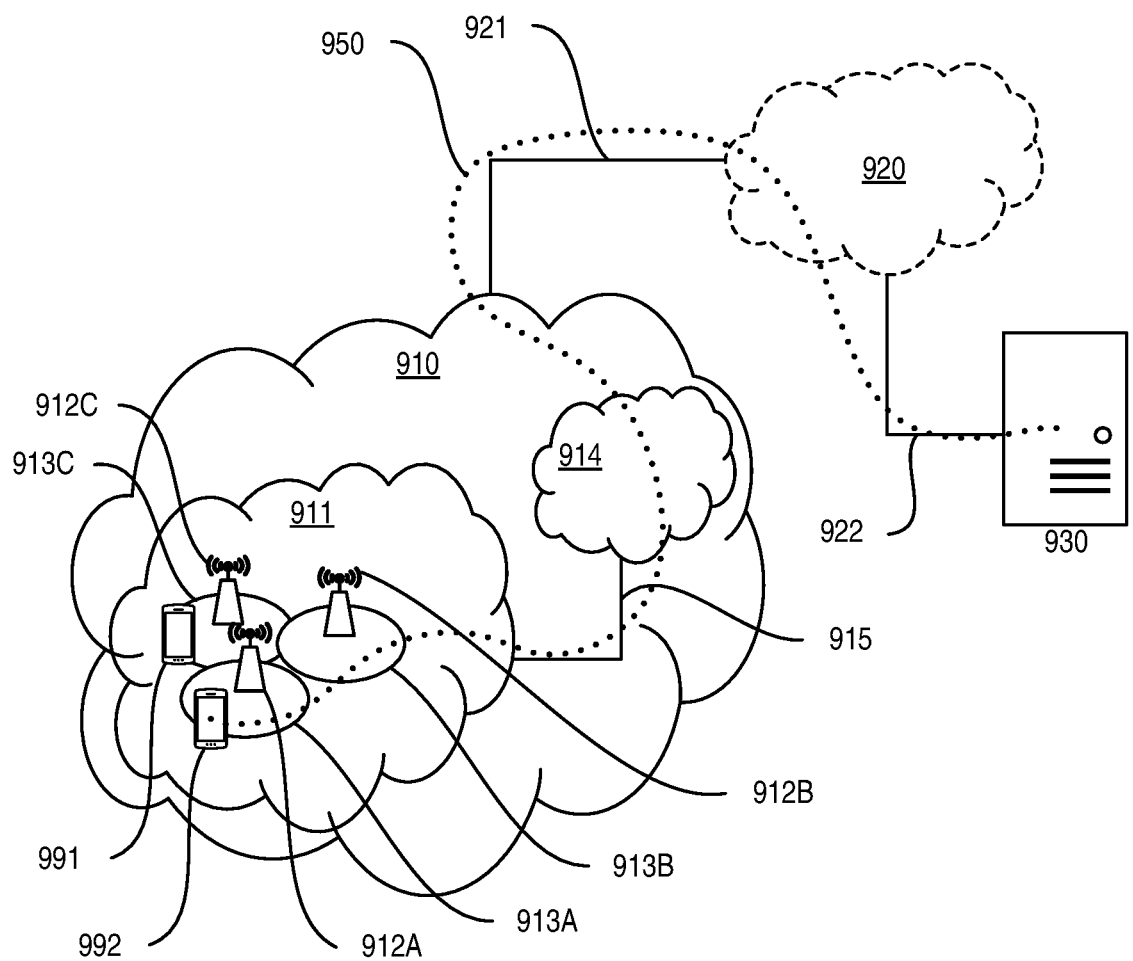
FIG. 9 depicts a network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a RAN, and a core network 914. The access network 911 comprises a plurality of base stations 912*a*, 912*b*, 912*c*, such as Node Bs, eNBs, gNBs, or other types of wireless access points, each defining a corresponding coverage area 913*a*, 913*b*, 913*c*. Each base station 912*a*, 912*b*, 912*c* is connectable to the core network 914 over a wired or wireless connection 915.

A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server, or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. The intermediate network 920 may be one of, or a combination of more than one of, a public, private, or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an Over-The-Top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station, and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, ASICs, FPGAs, or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least the wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, ASICs, FPGAs, or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, ASICs, FPGAs, or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
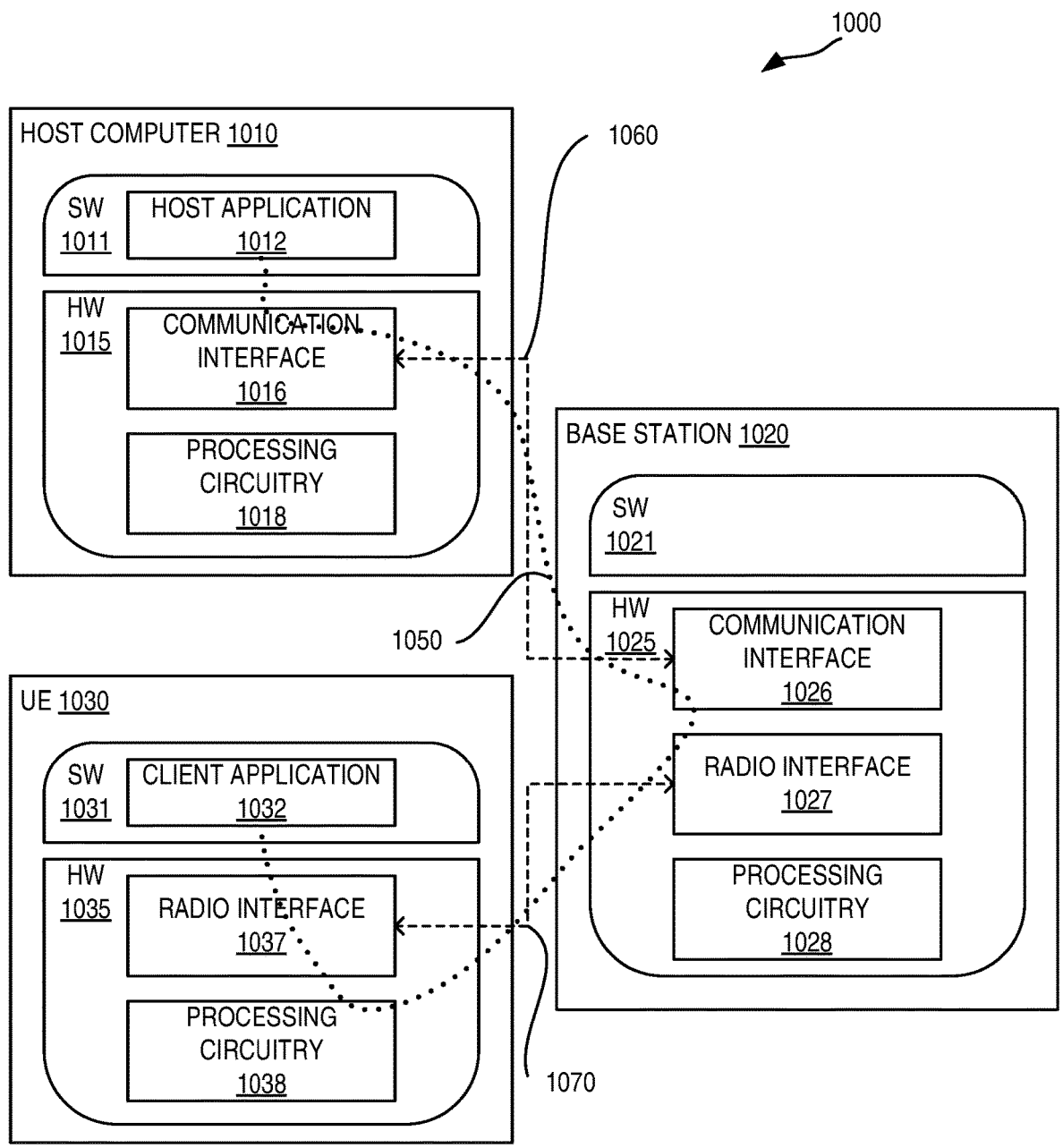
FIG. 10 depicts a host computer communicating via a base station with a UE over a partially wireless connection in accordance with some embodiments of the present disclosure.

It is noted that the host computer 1010, the base station 1020, and the UE 1030 illustrated in FIG. 10 may be similar or identical to the host computer 930, one of the base stations 912a, 912b, 912c, and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency, power, consumption of wireless devices, and decrease overhead in NTNs and thereby provide benefits such as extended battery life and improved latency and data rates.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in the software 1011 and the hardware 1015 of the host computer 1010 or in the software 1031 and the hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

FIG. 11 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

FIG. 12 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figures 13, 14:
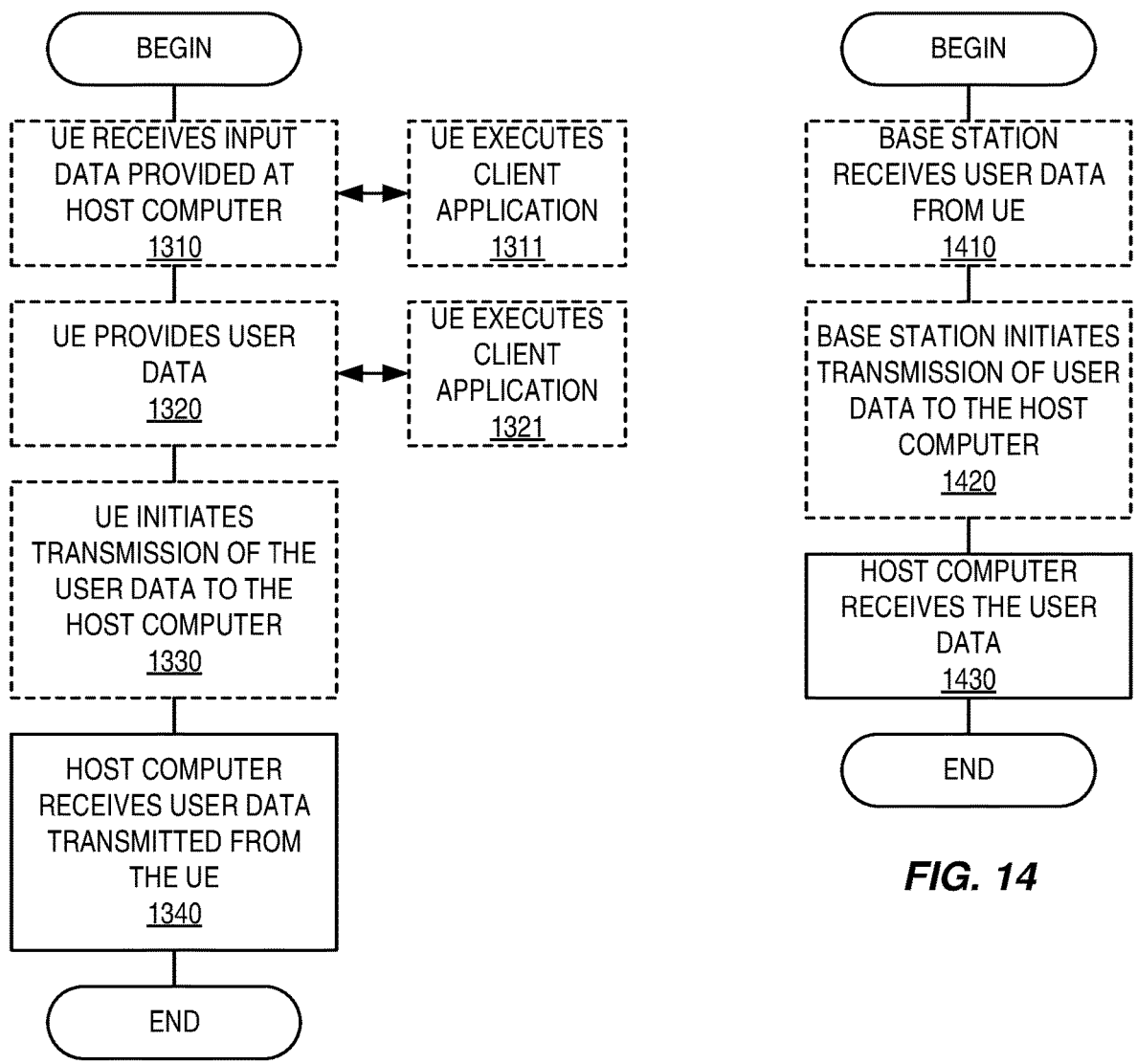
FIG. 13 depicts a flowchart of a method implemented in a communication system including a host computer, a base station, and a UE in accordance with some embodiments of the present disclosure.
FIG. 14 depicts a flowchart of a method implemented in a communication system including a host computer, a base station, and a UE in accordance with some embodiments of the present disclosure.

FIG. 13 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Some example embodiments of the present disclosure are as follows:

Group A Embodiments

Embodiment 1: A method performed by a wireless device the method comprising: obtaining a characterization of a Doppler variation rate within a cell of a non-terrestrial network, NTN, from a network node of the NTN; tuning a local frequency reference of the wireless device; adjusting the tuning of the local frequency reference based on the characterization of the Doppler variation rate within the cell; and transmitting signals to or receiving signals from the NTN based on the adjusted local frequency reference.

Embodiment 2: The method of the preceding embodiment, further comprising correcting a transmit frequency or receive frequency of the wireless device.

Embodiment 3: The method of the preceding embodiment, wherein correcting the transmit frequency comprises offsetting the transmit frequency from an ideal transmit frequency, such that signals received from the wireless device are received at the ideal frequency.

Embodiment 4: The method of any of the previous embodiments, wherein the network node is one of a terrestrial base station and a satellite base station or satellite gateway.

Embodiment 5: The method of any of the previous embodiments, wherein the characterization of the Doppler variation rate is pre-calculated by the network node.

Embodiment 6: The method of any of the previous embodiments, wherein the characterization of the Doppler variation rate is a linear approximation based on a Doppler rate.

Embodiment 7: The method of any of the previous embodiments, wherein adjusting the tuning of the local frequency reference based on the characterization of the Doppler variation rate comprises periodically adjusting the local frequency reference by a fixed amount.

Embodiment 8: The method of any of the previous embodiments, further comprising adjusting a timing advance of the wireless device based on the characterization.

Embodiment 9: A method performed by a wireless device the method comprising: receiving broadcasted information including drift information from an NTN in communication with the wireless device; obtaining a timing drift from the received drift information; correcting a transmission timing of the wireless device based on the timing drift.

Embodiment 10: The method of the previous embodiment, wherein the broadcasted information is system information.

Embodiment 11: The method of any of the previous embodiments, wherein the NTN requires the wireless device to acquire new broadcasted information before an initial access attempt.

Embodiment 12: The method of the previous embodiment, wherein the UE must have acquired the timing drift information no earlier than slot $n-n_{drift}$, wherein n is the slot in which the initial access attempt is to be made and $n_{drift}$ can either be fixed or signaled in the broadcasted information.

Embodiment 13: The method of any of the previous embodiments, further comprising: triggering a timer upon receipt of the drift information; and obtaining new drift information upon expiration of the timer.

Embodiment 14: The method of any of the previous embodiments, further comprising: receiving DCI signaling instructing the wireless device to obtain new broadcasted information.

Embodiment 15: The method of any of the previous embodiments, further comprising: receiving additional information from the NTN; and predicting the timing drift as a function of time, based on the additional information, wherein the predicting the timing drift comprises predicting the timing drift based on at least one of a predefined rule, a formula, or a table.

Embodiment 16: The method of any of the previous embodiments, further comprising correcting a transmission frequency of the wireless device based on the drift information.

Embodiment 17: The method performed by a wireless device the method comprising: entering a connected mode with an NTN in communication with the wireless device; receiving information that is specific to the wireless device from the NTN; obtaining a timing drift from the received drift information; and correcting a transmission timing or receipt timing of the wireless device based on the timing drift.

Embodiment 18: The method of the preceding embodiment, wherein the information that is specific to the wireless device comprises RRC signaling.

Embodiment 19: The method of any of the preceding embodiments, wherein the timing drift comprises an actual timing drift, a differential timing drift, or a rate of change of the timing drift.

Embodiment 20: A method performed by a wireless device the method comprising: receiving drift information from an NTN in communication from the wireless device; obtaining a timing drift from the received drift information; obtaining a frequency drift from the received drift information; and correcting a transmission timing or receipt timing of the wireless device based on the timing drift and/or correcting a transmission frequency or receipt frequency of the wireless device based on the frequency drift.

Embodiment 21: The method of the previous embodiment, further comprising: obtaining a rate of change of the timing drift; obtaining a rate of change of the frequency drift; and correcting a transmission timing or receipt timing of the wireless device based on the rate of change of the timing drift and/or correcting a transmission frequency or receipt frequency of the wireless device based on the rate of change of the frequency drift.

Embodiment 22: The method of any of the preceding embodiments, wherein the drift information comprises a satellite's speed and acceleration, wherein the satellite is included in the NTN.

Embodiment 23: A method performed by a wireless device the method comprising: receiving drift information from an NTN in communication with the wireless device;

receiving downlink reference signals from the NTN; obtaining a timing drift and/or a frequency drift based on the received drift information and the downlink reference signals; and correcting a transmission or receipt timing and/or a transmission or receipt frequency of the wireless device based on the timing drift.

Embodiment 24: The method of any of the preceding embodiments, further comprising receiving an instruction from the NTN to obtain the timing drift and/or frequency drift based on the downlink reference signals.

Embodiment 25: The method of the any of the preceding embodiments, wherein the downlink reference signals are received from a single node in the NTN to provide additional correction information.

Embodiment 26: The method of any of the preceding embodiments, wherein obtaining the timing drift and/or the frequency drift based on the received drift information and the downlink reference signals comprises using a weighted average of a drift information component and a downlink reference signal component of the timing drift and/or the frequency drift.

Embodiment 27: The method of any of the preceding embodiments, wherein obtaining the timing drift and/or the frequency drift comprises using filter or mathematical function to produce the timing drift and/or the frequency drift.

Embodiment 28: A method performed by a wireless device the method comprising: receiving a Doppler rate from an NTN in communication with the wireless device; adjusting a locally-stored Doppler value based on the received Doppler rate; adjusting a local frequency reference based on the adjusted local-stored Doppler value; and calculating an updated uplink frequency correction factor and/or an updated ideal frequency reference factor.

Group B Embodiments

Embodiment 29: A method performed by a network node, in a non-terrestrial network, the non-terrestrial network comprising a network node, and a communications satellite, wherein the network node is one of a terrestrial base station and a satellite base station or satellite gateway, the method comprising: providing drift information to a wireless device in communication with the non-terrestrial network; transmitting signals to the wireless device; and receiving signals from the wireless device, wherein the signals are transmitted by the wireless device based on the drift information.

Embodiment 30: The method of the previous embodiment, wherein the drift information comprises at least one of: a velocity vector of a satellite of the non-terrestrial network, the satellite receiving the signals from the wireless device; an acceleration vector of the satellite of the non-terrestrial network; an indicator of the velocity vector or the acceleration vector; frequency drift information; or timing information.

Group C Embodiments

Embodiment 31: A wireless device comprising: processing circuitry configured to perform any of the steps of any of the Group A embodiments; and power supply circuitry configured to supply power to the wireless device.

Embodiment 32: A network node/base station comprising: processing circuitry configured to perform any of the steps of any of the Group B embodiments; power supply circuitry configured to supply power to the wireless device.

Embodiment 33: A communication system including a host computer comprising: processing circuitry configured to provide user data; and a communication interface configured to forward the user data to a cellular network for transmission to a user equipment (wireless device), wherein the cellular network comprises a non-terrestrial network comprising a communication satellite and a network node, wherein the network node is one of a terrestrial base station and a satellite base station or satellite gateway; the network node having a radio interface and processing circuitry, the base station's processing circuitry configured to perform any of the steps of any of the Group B embodiments.

Embodiment 34: The communication system of the pervious embodiment further including the network node.

Embodiment 35: The communication system of the previous 2 embodiments, further including the wireless device, wherein the wireless device is configured to communicate with the base station.

Embodiment 36: The communication system of the previous 3 embodiments, wherein: the processing circuitry of the host computer is configured to execute a host application, thereby providing the user data; and the wireless device comprises processing circuitry configured to execute a client application associated with the host application.

Embodiment 37: A method implemented in a communication system including a host computer, a non-terrestrial network comprising a communication satellite and a network node, wherein the network node is one of a terrestrial base station and a satellite base station or satellite gateway and a user equipment (wireless device), the method comprising: at the host computer, providing user data; and at the host computer, initiating a transmission carrying the user data to the wireless device via a cellular network comprising the network node, wherein the network node performs any of the steps of any of the Group B embodiments.

Embodiment 38: The method of the previous embodiment, further comprising, at the base station, transmitting the user data.

Embodiment 39: The method of the previous 2 embodiments, wherein the user data is provided at the host computer by executing a host application, the method further comprising, at the wireless device, executing a client application associated with the host application.

Embodiment 40: A user equipment (UE) configured to communicate with a base station, the UE comprising a radio interface and processing circuitry configured to performs the of the previous 3 embodiments.

At least some of the following abbreviations may be used in this disclosure. If there is an inconsistency between abbreviations, preference should be given to how it is used above. If listed multiple times below, the first listing should be preferred over any subsequent listing(s).

μs Microsecond
2G Second Generation
3G Third Generation
3GPP Third Generation Partnership Project
4G Fourth Generation
5G Fifth Generation
AC Alternating Current
AP Access Point
ASIC Application Specific Integrated Circuit
ATM Asynchronous Transfer Mode
BSC Base Station Controller
BTS Base Transceiver Station
CD Compact Disk
CDMA Code Division Multiple Access
CE Control Element
COTS Commercial Off-The-Shelf
CP Cyclic Prefix CPE Customer Premise Equipment
CPU Central Processing Unit
D2D Device-to-Device
DAS Distributed Antenna System
DC Direct Current
DCI Downlink Control Information
DIMM Dual In-line Memory Module
DL-RS Downlink Reference Signal
DSP Digital Signal Processor
DVD Digital Video Disk
EEPROM Electrically Erasable Programmable Read Only Memory
eMTC Enhanced Machine Type Communication
eNB Enhanced or Evolved Node B
EPROM Erasable Programmable Read Only Memory
E-SMLC Evolved Serving Mobile Location Center
FDD Frequency Division Duplexing
FPGA Field Programmable Gate Array
GEO Geostationary Orbit
GHz Gigahertz
gNB New Radio Base Station
GNSS Global Navigation Satellite System
GPS Global Positioning System
GSM Global System for Mobile Communications
HDDS Holographic Digital Data Storage
HD-DVD High-Density Digital Versatile Disc
Hz Hertz
I/O Input and Output
IoT Internet of Things
IP Internet Protocol
kHz Kilohertz
km Kilometer
LAN Local Area Network
LEE Laptop Embedded Equipment
LEO Low Earth Orbit
LME Laptop Mounted Equipment
LTE Long Term Evolution
M2M Machine-to-Machine
MAC Medium Access Control
MANO Management and Orchestration
MCE Multi-Cell/Multicast Coordination Entity
MDT Minimization of Drive Tests
MEO Medium Earth Orbit
MIMO Multiple Input Multiple Output
MME Mobility Management Entity
ms Millisecond
MSC Mobile Switching Center
MSR Multi-Standard Radio
MTC Machine Type Communication
NB-IoT Narrowband Internet of Things
NFV Network Function Virtualization
NGSO Non-Geostationary Orbit
NIC Network Interface Controller
NR New Radio
NTN Non-Terrestrial Network
O&M Operation and Maintenance
OFDM Orthogonal Frequency Division Multiplexing
OFDMA Orthogonal Frequency Division Multiple Access
OSS Operations Support System
OTT Over-The-Top
PDA Personal Digital Assistant
PRACH Physical Random Access Channel
PROM Programmable Read Only Memory
PSS Primary Synchronization Signal
PSTN Public Switched Telephone Network
RAID Redundant Array of Independent Disks
RAM Random Access Memory
RAN Radio Access Network
RAR Random Access Response
RAT Radio Access Technology
RF Radio Frequency
RNC Radio Network Controller
ROM Read Only Memory
RRC Radio Resource Control
RRH Remote Radio Head
RRU Remote Radio Unit
RTT Round Trip Time
RUIM Removable User Identity Module
s Second
SC-FDMA Single Carrier Frequency Division Multiple Access
SCS Subcarrier Spacing
SD-RAM Synchronous Dynamic Random Access Memory
SI Study Item
SIM Subscriber Identity Module
SOC System on a Chip
SON Self-Organizing Network
SONET Synchronous Optical Networking
SSS Secondary Synchronization Signal
TA Timing Advance
TCP/IP Transmission Control Protocol/Internet Protocol
TDD Time Division Duplexing
TDOA Time Difference Of Arrival
TOA Time Of Arrival
UE User Equipment
UMTS Universal Mobile Telecommunications System
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method performed by a User Equipment (UE) for compensating for a Doppler shift in a wireless network, the method comprising:
   obtaining, from a network node, a characterization of Doppler variations in a particular cell;
   tuning a local frequency reference of the UE to a received downlink frequency for the particular cell; and
   adjusting the local frequency reference over time according to a pre-calculated characterization of Doppler variations in the particular cell.

2. The method of claim 1, further comprising transmitting signals to or receiving signals from the wireless network based on the adjusted local frequency reference.

3. The method of claim 1, further comprising:
   obtaining, during random access to the particular cell, a correction term that compensates for a Doppler shift in an uplink transmit frequency of the UE for the particular cell; and adjusting the correction term over time according to the characterization of Doppler variations in the particular cell.

4. The method of claim 1, wherein the characterization of Doppler variations in the particular cell is a linear approximation quantified by a Doppler rate.

5. The method of claim 4, wherein adjusting the local frequency reference over time according to the characterization of Doppler variations in the particular cell comprises periodically adjusting the local frequency reference over time according to the Doppler rate.

6. The method of claim 5, wherein the local frequency reference determines a downlink receive frequency of the UE.

7. The method of claim 4, further comprising:
obtaining, during random access to the particular cell, a correction term that compensates for a Doppler shift in an uplink transmit frequency of the UE for the particular cell; and
adjusting the correction term based on the Doppler rate.

8. The method of claim 1, further comprising:
obtaining, during random access to the particular cell, a relative Doppler shift adjustment factor, d;
adjusting the relative Doppler shift adjustment factor, d, over time according to the characterization of Doppler variations in the particular cell; and
adjusting an uplink transmit frequency correction factor $1^2/1+d$ over time based on the adjusted relative Doppler shift adjustment factor, d.

9. The method of claim 1, wherein obtaining the characterization of Doppler variations in the particular cell comprises receiving the characterization of Doppler variations in the particular cell via a connection configuration message, a handover command, system information, or a paging message.

10. The method of claim 1, further comprising:
obtaining, during random access to the particular cell, a relative Doppler shift adjustment factor;
adjusting the relative Doppler shift adjustment factor over time according to the characterization of Doppler variations in the particular cell; and
adjusting an ideal frequency reference based on the adjusted relative Doppler shift adjustment factor.

11. The method of claim 10, wherein an uplink transmit frequency of the UE is based on the ideal frequency reference.

12. The method of claim 10, wherein adjusting the local frequency reference over time according to the characterization of Doppler variations in the particular cell comprises adjusting the local frequency reference over time based on the adjusted relative Doppler shift adjustment factor.

13. The method of claim 1, wherein the wireless network is a Non-Terrestrial Network.

14. The method of claim 1, wherein the network node is a terrestrial base station, a non-terrestrial base station, or a gateway for a non-terrestrial base station.

15. The method of claim 1, wherein the characterization of Doppler variations within the particular cell is pre-calculated.

16. The method of claim 1, further comprising performing timing correction at the UE based on information related to timing drift.

17. The method of claim 1 wherein adjusting the local frequency reference over time comprises adjusting the local frequency reference over time based on a hybrid approach that considers both the characterization of Doppler variations in the particular cell and Doppler variation estimated using downlink reference signals.

18. A User Equipment (UE) for compensating for a Doppler shift in a wireless network, the UE comprising:
a radio interface; and
processing circuitry associated with the radio interface, the processing circuitry configured to cause the UE to:
obtain, from a network node, a characterization of Doppler variations in a particular cell;
tune a local frequency reference of the UE to a received downlink frequency for the particular cell; and
adjust the local frequency reference over time according to a pre-calculated characterization of Doppler variations in the particular cell.

19. The UE of claim 18, wherein the processing circuitry configured to cause the UE to transmit signals to or receive signals from the wireless network based on the adjusted local frequency reference.

20. The UE of claim 18, wherein the processing circuitry configured to cause the UE to:
obtain, during random access to the particular cell, a correction term that compensates for a Doppler shift in an uplink transmit frequency of the UE for the particular cell; and
adjust the correction term over time according to the characterization of Doppler variations in the particular cell.

* * * * *